(12) United States Patent
Dunagan et al.

(10) Patent No.: US 7,379,447 B2
(45) Date of Patent: May 27, 2008

(54) SLOTTED SEEDED CHANNEL HOPPING FOR CAPACITY IMPROVEMENT IN WIRELESS NETWORKS

(75) Inventors: John D. Dunagan, Bellevue, WA (US); Paramvir Bahl, Sammamish, WA (US); Ranveer Chandra, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 10/947,838

(22) Filed: Sep. 23, 2004

(65) Prior Publication Data

US 2005/0063328 A1    Mar. 24, 2005

Related U.S. Application Data

(63) Continuation-in-part of application No. 10/428,218, filed on May 2, 2003.

(51) Int. Cl.
*H04J 3/06* (2006.01)
*H04B 1/00* (2006.01)
*H04B 5/00* (2006.01)
*H04B 7/00* (2006.01)

(52) U.S. Cl. ............... 370/350; 375/134; 370/324; 370/338; 370/329; 455/41.1; 455/41.2; 455/41.3

(58) Field of Classification Search ............... 375/132; 455/41, 41.1, 41.2; 370/324, 350, 349, 436, 370/437, 338, 329
See application file for complete search history.

(56) References Cited

U.S. PATENT DOCUMENTS

| | | | | |
|---|---|---|---|---|
| 2,292,387 A | * | 8/1942 | Markey et al. ............... 380/34 |
| 4,601,043 A | * | 7/1986 | Hardt et al. ................. 375/134 |
| 4,606,040 A | * | 8/1986 | David et al. .................. 380/34 |
| 4,677,617 A | * | 6/1987 | O'Connor et al. .......... 370/478 |
| 5,079,768 A | * | 1/1992 | Flammer .................... 370/349 |
| 5,130,987 A | * | 7/1992 | Flammer .................... 370/436 |
| 5,204,855 A | * | 4/1993 | Bebee et al. ................. 370/436 |
| 5,644,576 A | * | 7/1997 | Bauchot et al. ............. 370/437 |
| 5,657,317 A | * | 8/1997 | Mahany et al. ............. 370/338 |
| 6,028,853 A | * | 2/2000 | Haartsen .................... 370/338 |

(Continued)

OTHER PUBLICATIONS

By Core Specification of the Bluetooth System Specification vol. 1, Version 1.0B, Dec. 1, 1999, pp. 18,21,44,87,91-93.*

(Continued)

*Primary Examiner*—Nick Corsaro
*Assistant Examiner*—Daniel Lai
(74) *Attorney, Agent, or Firm*—Wolf, Greenfield & Sacks, P.C.

(57) ABSTRACT

A system and method that increases the capacity of a wireless network using frequency diversity. A user switches between channels of a network using a single network interface card in such a manner that nodes desiring to communicate overlap while disjoint communications mostly do not overlap. A driver is inserted into a device's networking stack and controls the network interface card using a plurality of virtual wireless network adapters. Packets for a recipient are queued when the recipient is not accessible on the node's channel. In one embodiment where multiple nodes are switching in and out of channel, the method changes part of a nodes channel hopping schedule to ensure concurrent connectivity in a channel for at least a brief time period such that packets can be received/transmitted with desired nodes.

37 Claims, 18 Drawing Sheets

U.S. PATENT DOCUMENTS

| | | | |
|---|---|---|---|
| 6,088,381 A * | 7/2000 | Myers, Jr. | 375/132 |
| 6,259,898 B1 * | 7/2001 | Lewis | 455/103 |
| 6,292,475 B1 * | 9/2001 | Swail | 370/329 |
| 6,650,660 B1 * | 11/2003 | Koehler et al. | 370/503 |
| 2002/0094797 A1 * | 7/2002 | Marshall et al. | 455/403 |

OTHER PUBLICATIONS

C. Perkins, E. Belding-Royer, and S. Das. Ad Hoc On-Demand Distance Vector (ADOV) Routing. In IETF RFC 3561, Jul. 2003.

A.-L Wu, C.-Y. Lin, Y.-C. Tseng, and J.-P. Sheu. A New Multi-Channel MAC Protocol with On-Demand Channel Assignment for Multi-Hop Mobile Ad Hoc Networks. In International Symposium on Parallel Architectures, Algorithms and Networks (I-SPAN) 2000.

D. Johnson, D. Maltz, and J. Broch. DSR: The Dynamic Source Routing Protocol for Multihop Wireless Ad Hoc Networks. In C. Persons, editor, Ad Hoc Networking, chapter 5, pp. 139-172. Addison-Wesley, 2001.

R. Chandra, P. Bahl, and P. Bahl. MultiNet: Connecting to Multiple IEEE 802.11 Networks Using a Single Wireless Card. In IEEE Infocom 2004 Proceedings.

I. Chlamtac and A. Farago. Making Transmission Schedules Immune to Topology Changes in Multi-Hop Packet Radio Networks. IEEE/ACM Transactions on Networking, 2(1):23-29, Feb. 1994.

D.D. Couto, D. Aguayo, J. Bicket, and R. Morris. A High-Throughput Path Metric for Multi-Hop Wireless Routing. In ACM MobiCom 2003.

I. Chlamtac, C. Petrioli, and J. Redi. Energy-Conserving Access Protocols for Identification Networks. IEEE/ACM Transactions on Networking, 7(1):51-61, Feb. 1999.

I. Chlamtac and A. Farago. Time-Spread Multiple-Access (TSMA) Protocols for Multihop Mobile Radio Networks. IEEE/ACM Transactions on Networking, 5(6):804-812, Dec. 1997.

J. Elson, L. Girod, and D. Estrin. Fine-Grained Network Time Synchronization Using Reference Broadcasts. In USENIX OSDI 2002.

F. Fitzek, D. Angelini, G. Mazzini, and M. Zorzi. Design and Performance of an Enhanced IEEE 802.11 MAC Protocol for Multihop Coverage Extension. IEEE Wireless Communications, 10(6):30-39, Dec. 2003.

F. Herzel, G. Fischer, and H. Gustat. An Integrated CMOS RF Synthesizer for 802.11a Wireless LAN. IEEE Journal of Solid-State Circuits, 38(10), Oct. 2003.

M. Heusse, F. Rousseau, G. Berger-Sabbatel, and A. Duda. Performance Anomaly of 802.11b. In IEEE Infocom 2003.

L. Huang and T.-H. Lai. On the Scalability of IEEE 802.11 Ad Hoc Networks. In ACM MobiHoc 2002.

K. Jain, J. Padhye, V. Padmanabhan, and L. Qui. Impact of Interference on Multi-hop Wireless Network Performance. In ACM MobiCom 2003.

N. Jain, S.R. Das, and A. Nasipuri. A Multichannel CSMA MAC Protocol with Receiver-Based Channel Selection for Multihop Wireless Networks. In IEEE International Conference on Computer Communications Networks (IC3N) 2001.

R. Karrer, A Sabharwal, and E. Knightly. Enabling Large-scale Wireless Broadband: The Case for TAPs. In ACM HotNets 2003.

R. Rozovsky and P. Kumar. SEEDEX: A MAC Protocol for Ad Hoc Networks. In ACM Mobi-Hoc 2001.

J. Li, Z.J. Haas, M. Sheng, and Y. Chen. Performance Evaluation of Modified IEEE 802.11 MAC for Multi-Channel Multi-Hop Ad Hoc Network. In IEEE International Conference on Advanced Information Networking and Applications (AINA) 2003.

Y.Li, H. Wu, D. Perkins, N.-F. Tzeng, and M. Bayoumi. MAC-SCC: Medium Access Control with a Separate Control Channel for Multihop Wireless Networks. In IEEE International Conference on Distributed Computing Systems (ICDCS) Workshop 2003.

A. Nasipuri and S.R. Das. Multichannel CSMA with Signal Power-Based Channel Selection for Multihop Wireless Networks. In IEEE Vehicular Technology Conference (VTC) 2000.

E. Shih, P. Bahl, and M. Sinclair. Wake on Wireless: An Event Driven Power Saving Strategy for Battery Operated Devices. In ACM MobiCom2002.

J. So and N. Vaidya. Multi-Channel MAC for Ad Hoc Networks: Handling Multi-Channel Hidden Terminals Using a Single Transceiver. In ACM MobiHoc 2004.

A. Tzamaloukas and J.J. Garcia-Luna-Aceves. Channel-Hopping Multiple Access. In IEEE International Communications Conference (ICC) 2000.

S. Xu and T. Saadawi. Does the IEEE 802.11 MAC Protocol Work Well in Multihop Wireless Ad Hoc Networks? IEEE Communications Magazine, pp. 130-137, Jun. 2001.

Z. Tang and J.J. Garcia-Luna-Aceves. Hop-Reservation Multiple Access (HRMA) for Ad-Hoc Networks. In IEEE Infocom 1999.

IEEE 802.11b/D3.0, Wireless LAN Medium Access Control (MAC) and Physical (PHY) Layer Specification: High Speed Physical Layer Extensions in the 2.4 GHz Band, 1999.

EN-3001 Intelligent Wideband WLAN Technology, http://www.engim.com/products_technology.html, last visited Aug. 18, 2004.

* cited by examiner

A: | 1 | 2 | 0 | 0 | 2 | 1 | 2 | 1 |

(x1,a1)  (1,2)  (1,2)  (0,2)  (0,2)  (2,2)  (2,2)  (1,2)  (1,2)
(x2,a2)  (2,1)  (2,1)  (0,1)  (0,1)  (1,1)  (1,1)  (2,1)  (2,1)
Slot:      1     2     1     2     1     2  Parity  1

B: | 1 | 0 | 0 | 1 | 2 | 2 | 2 | 1 |

(x1,a1)  (1,2)  (1,2)  (0,2)  (0,2)  (2,2)  (2,2)  (1,2)  (1,2)
(x2,a2)  (0,1)  (0,1)  (1,1)  (1,1)  (2,1)  (2,1)  (2,1)  (2,1)
Slot:      1     2     1     2     1     2  Parity  1

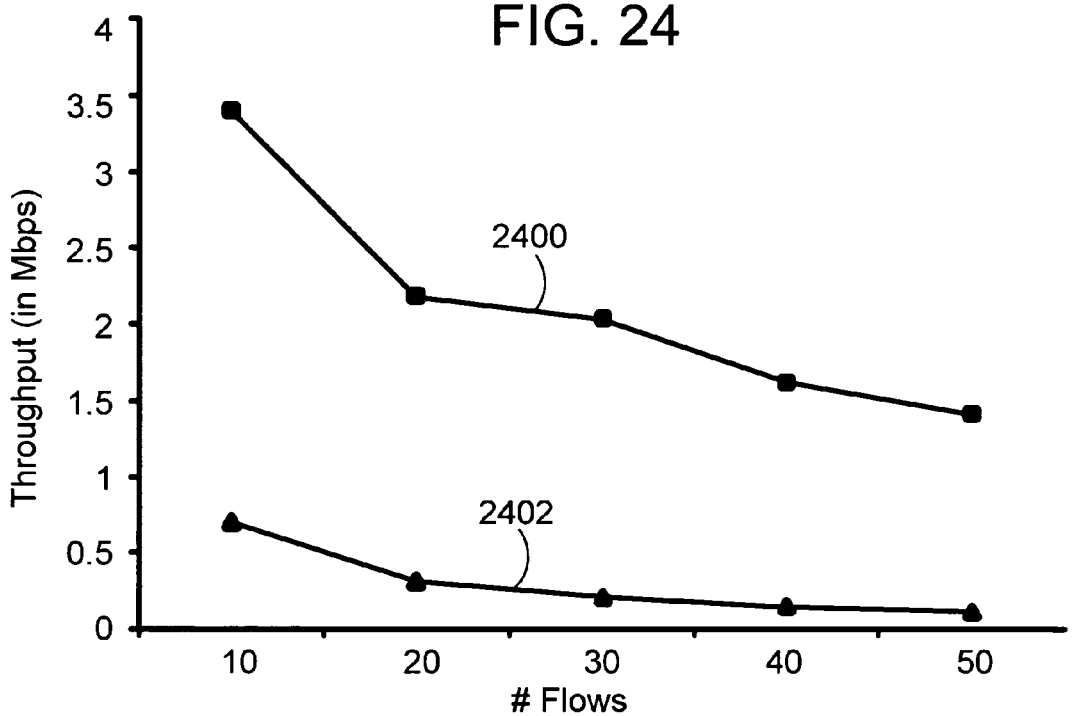
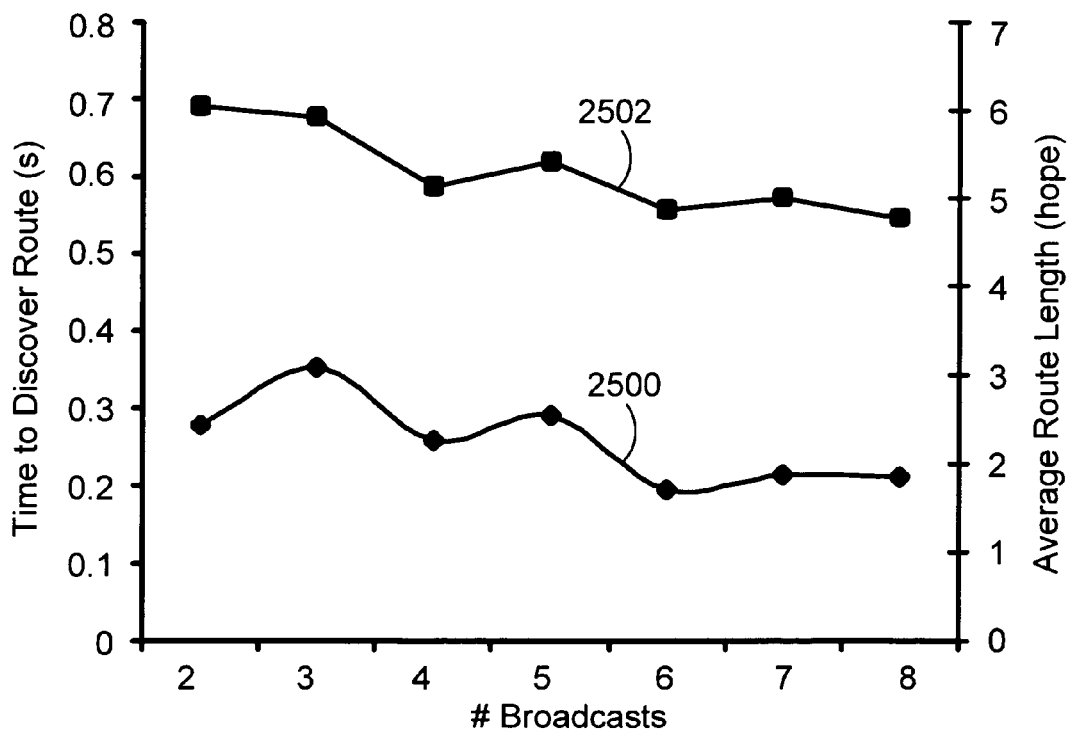

SLOTTED SEEDED CHANNEL HOPPING FOR CAPACITY IMPROVEMENT IN WIRELESS NETWORKS

CROSS-REFERENCE TO RELATED PATENT APPLICATIONS

This patent application is a continuation-in-part of copending U.S. patent application Ser. No. 10/428,218, filed May 2, 2003, now pending.

BACKGROUND OF THE INVENTION

This invention relates generally to wireless networks and, more particularly, relates to the operation of a wireless node functioning at the same time as a member of multiple disjoint channels in a single wireless network.

With the development and deployment of wireless networking devices such as laptop computers, personal digital assistant devices, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility.

However, while the concept of mobile computing on wireless networks is well accepted, the implementation of this concept has taken on many forms. That is, there now exists several different wireless protocol standards that are competing in the marketplace. These standards include 802.11b (also know as Wi-Fi for wireless fidelity), 802.11a (also know as Wi-Fi5), 802.11 g, HomeRF, Bluetooth, Wireless 1394, HiperLAN2, UWB, ZigBee, etc. Each of these different standards has particular advantages and is being developed with particular applications and users in mind. Despite the numerous standards, devices conducting network communications over wireless links are becoming increasing popular.

Wireless links typically transmit data over radio frequency channels but may operate over other carrier frequency ranges, such as infrared. Most radio frequency ("RF") based wireless networks are designed to be able to operate in two basic modes: the infrastructure mode and the peer-to-peer or ad hoc mode.

In the infrastructure ("IS") mode, which is also sometimes referred to as the managed network mode, each wireless network node communicates with the other nodes in the network through an access point ("AP") node of the IS network. The packets directed by an IS node to another IS node carry the AP's Media Access Control ("MAC") address in the link layer header. The access point functions as a bridge, repeater, gateway, and/or firewall between wireless nodes and wired nodes of the network. The access point may apportion bandwidth of the communication channel to the wireless IS nodes to ensure the quality of the communications. In the ad hoc ("AH") mode, a wireless node communicates directly, i.e., in a peer-to-peer fashion, with other nodes within its RF range without going through an intermediate node such as the access point of the IS network. Ad hoc wireless network connections are useful when close-by users want to communicate with each other in places where no IS network exists, or when they fail to be authorized by the access point of an existing IS network.

Conventionally, there is no interaction between nodes in an infrastructure network and nodes in an ad hoc network even if they have overlapping transmission ranges. There are, however, a number of scenarios in which it is desirable for a device to be connected simultaneously to multiple wireless networks. For instance, in one scenario, employees from company A conduct a business meeting at company B with an employee of company B. Company B has an internal corporate network that supports an infrastructure wireless network. The visitors need to share electronic information such as documents, presentations, and data with their host. This can be done if the visitors can use their laptop computers to communicate wirelessly with the laptop computer of company B. For security concerns, the visitors are not allowed access to company B's internal network. Thus, the laptop computers of the visitors cannot operate as nodes of company B's infrastructure network.

Currently, multiple wireless network interface cards are used in the device to connect to multiple networks. Unfortunately, using multiple wireless network interface cards in battery operated devices is highly undesirable because of the excessive energy drain and consequent reduction of device lifetime. The computer industry has recognized this problem and has developed and is developing solutions. For example, methods have been developed to conserve battery power in devices to extend the time between battery charges. Another method, developed by the assignee of the instant application, uses a dual-mode wireless device that switches back and forth between an IS network and an AH network with the switching triggered by either polls signals transmitted by an access point of the IS network or by the controller of the dual-mode wireless device.

Although ad-hoc networks provide the ability to connect wireless nodes when an infrastructure network is unavailable, modern computers often find that the capacity of ad-hoc networks to be unsatisfactory. If one attempts to address this by having nodes switch across channels (and therefore distribute the burden of supporting a given communication pattern), a new challenge arises. When multiple devices are switching between orthogonal channels of a network, it is possible that two devices switching between the channels of a network get synchronized such that when one device switches to one network channel, the other one switches out of the network channel to another network channel or are switching between different network channels in lock-step. In other words, the devices are never on the same network channel at the same time. The two devices will never be able to communicate with each other on the network because the packets they send to each other are not buffered by any third party such as an Access point for delivery to the node when it switches onto the channel the third party is using.

BRIEF SUMMARY OF THE INVENTION

In view of the foregoing, the invention provides a system and method for nodes (i.e., devices) to switch across different channels (i.e., frequencies) in such a manner that nodes desiring to communicate overlap while disjoint communications mostly do not overlap. As a result, the disjoint communications rarely interfere with each other. A driver is inserted into a node's networking stack that sits on top of another driver that exposes a plurality of virtual wireless network adapters, one for each network/channel. The adapters are enabled and disabled in accordance with which network and/or channel is presently activated. Packets for a network are queued when the network is not enabled.

During operation, each node broadcasts its channel hopping schedule for other nodes to receive and store. This allows nodes to know other node's schedule. As a result, a node can change its channel hopping schedule to overlap with nodes by changing part of its channel hopping schedule to match that of other nodes.

The channel hopping schedule is represented as a set of a number of (channel, seed) pairs where the channel is the current channel and the seed is an input to the rule the node is using for switching to other channels for a slot. A node switches between slots and each slot switches channels in accordance with a (channel, seed) pair. Each node iterates through all of the channels in its current schedule by switching to the channel designated in the schedule in each new slot (i.e., each new time period) and then to a parity slot. The parity slot is used to prevent nodes from switching in lock-step without overlapping. If a node is switching in lock-step with another node, the node uses the other node's parity slot as a fixed target for the slot in which the node is changing channels. This results in the two nodes overlapping.

A de-synchronization methodology is used to reduce or eliminate channel congestion. A node compares the (channel, seed) pairs of the nodes that sent that nodes packets in a given slot with the (channel, seed) pairs of all the other nodes in the list of channel schedules the node has. If the number of other nodes synchronized to the same (channel, seed) pair is more than twice as many as the node communicated with in the previous occurrence of the slot, the node attempts to de-synchronize from the other nodes by choosing a new (channel, seed) pair for the slot.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 24 is a graph illustrating the per-flow throughput of flow of the invention and the 802.11a protocol with respect to the number of flows in a multi-hop mesh network of 100 nodes;

FIG. 25 is a graph illustrating the average time to discover a route and the average route length for randomly chosen routes in a 100 node network using DSR with the invention;

DETAILED DESCRIPTION OF THE INVENTION

Figure 1:
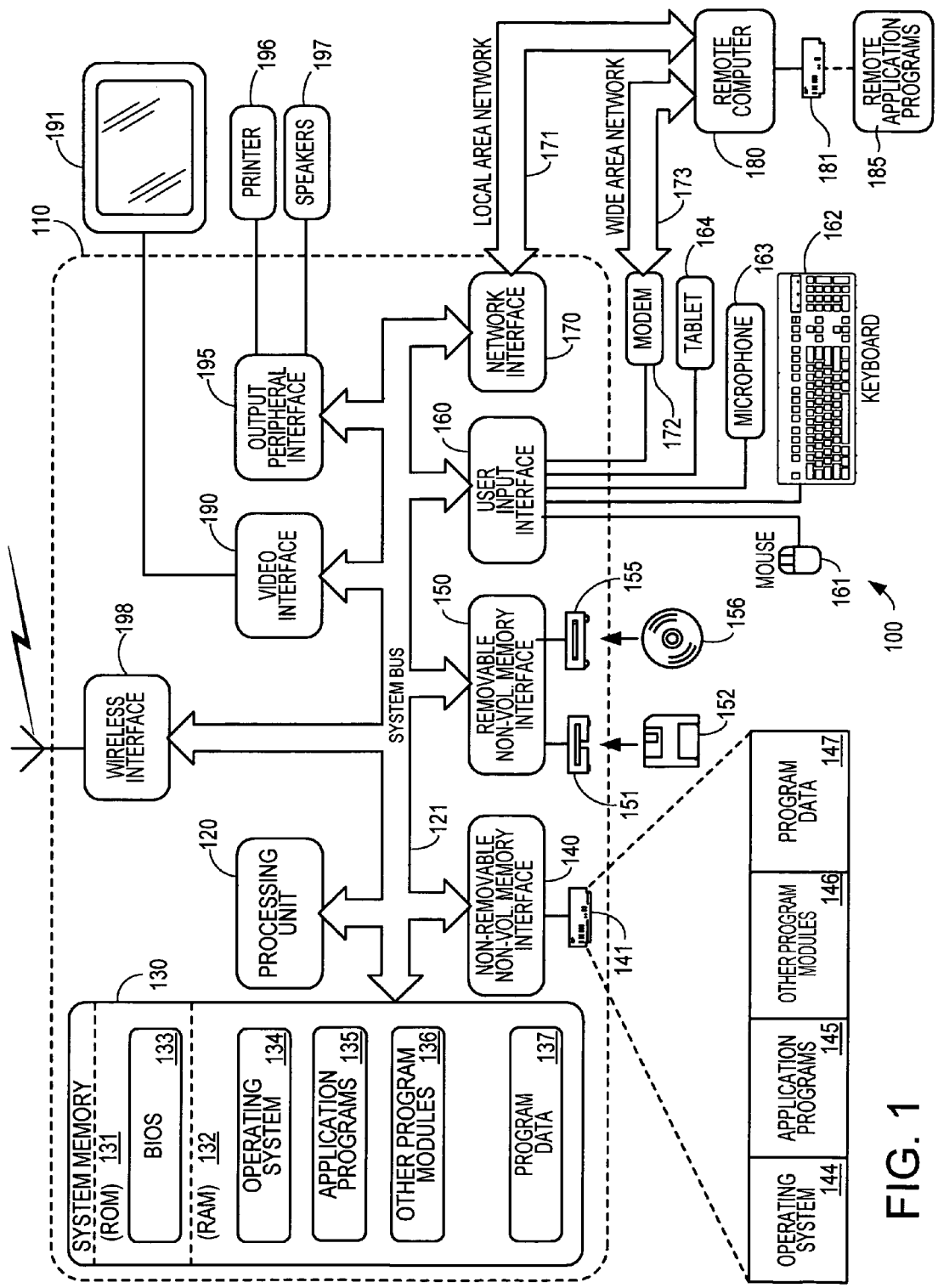
FIG. 1 is a block diagram generally illustrating an exemplary computer system on which the present invention resides.

The invention provides a method and system for switching between multiple channels in a network using a single wireless network interface card (i.e., radio). A radio switches between slots and each slot switches channels in accordance with a (channel, seed) pair. Each radio iterates through all of its slots by switching to the channel designated in the schedule in each new slot (i.e., in each new time period) and then to a parity slot. The parity slot is used to prevent nodes from switching in lock-step without overlapping. By switching between slots that switch between channels, the invention provides nodes with the ability to be synchronized with another node in a slot while having infrequent overlap between nodes that do not have data to send to each other and ensuring that all nodes come into contact occasionally (to avoid a logical partition). The use of a single radio avoids the cost associated with having multiple radios such as systems that have one radio on a channel designated as a control channel and other radios to send and/or receive data across channels. The invention also does not require that a channel be designated as a control channel; instead, any channel can be used to send control type messages, thereby eliminating a channel from being congested with control messages.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171, personal area network (PAN), a wide area network (WAN) 173, and a wireless link, for instance via wireless interface 198 complete with an antenna, but may also include other networks. Such networking environments are commonplace in offices, enterprise-wide computer networks, intranets and the Internet. While wireless interface 198 is shown directly connected to the system bus 121, it is recognized that the wireless interface 198 may be connected to the system bus 121 via network interface 170.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
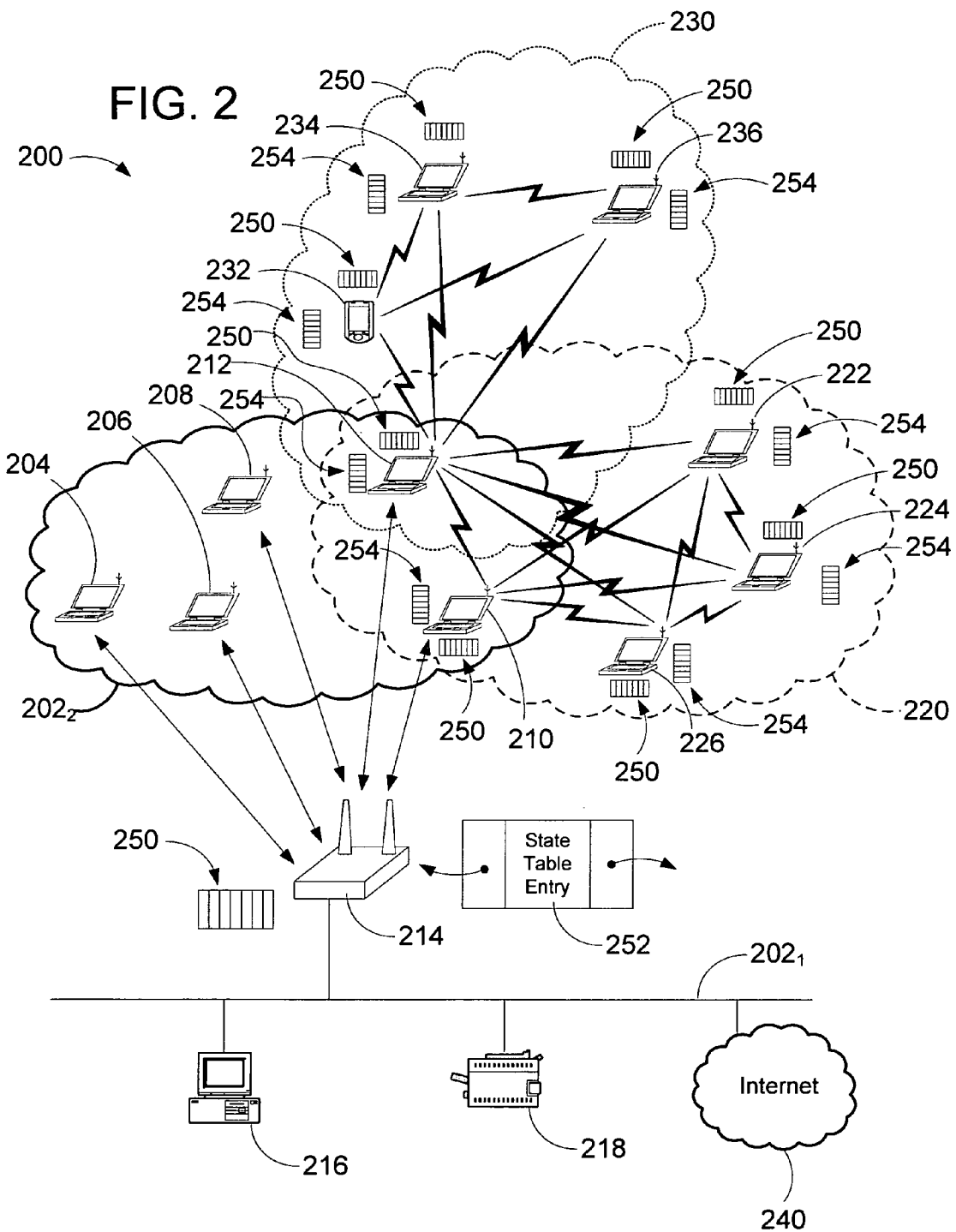
FIG. 2 is a block diagram generally illustrating an exemplary environment in which the present invention operates.

Turning now to FIG. 2, a computing environment 200 in which the invention may be used is shown. In the environment 200, an infrastructure network 202 consisting of wired portion $202_1$ and wireless portion $202_2$. Wireless portion $202_2$ has nodes 204-212 that communicate with access point 214. The access point 214 serves as an interface between the wireless portion $202_2$ and the wired portion $202_1$ of the network. Through the access point 214, the nodes 204-212 can access the wired portion $202_1$ of the infrastructure network and beyond to other connected networks such as the Internet 240 and the like. Each node has a wireless card, such as a network interface card, that communicates to other nodes via wireless interface 198.

Ad hoc network 220 has nodes 210, 212, 222, 224, and 226. Ad hoc network 230 has nodes 212, 232, 234, and 236. The nodes 204-212, 222-226, and 232-236 may be any device that communicates in a wireless medium such as IEEE 802.11, HomeRF, etc. For example, a node may be a computer 110, a PDA (personal digital assistant), a cellular phone that talks, and the like. It can be seen that node 210 is in infrastructure network 202 and ad hoc network 220. Node 212 is in infrastructure network 202, ad hoc network 220, and ad hoc network 230.

Figure 3:
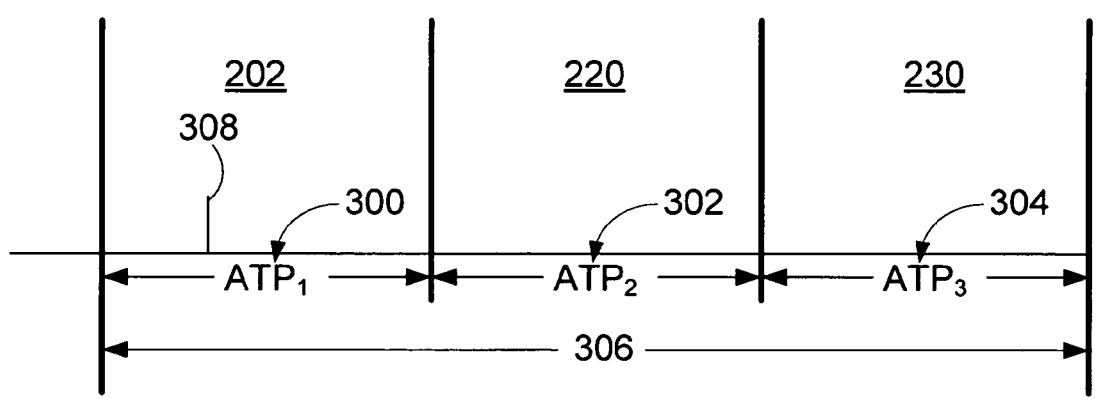
FIG. 3 is a schematic illustrating the relationship between activity period, switching cycle, and time elapsed.

In order for nodes such as node 210 and 212 to connect simultaneously to multiple networks, the invention multiplexes the wireless cards across multiple networks to achieve connectivity on all of the networks. For example, node 212 achieves connectivity on networks 202, 220, and 230 with the invention. An adaptive network hopping scheme is used. Turning now to FIG. 3, a wireless card gets a time slot, called an activity time period (ATP), for each network in which the wireless is connected. The $ATP_i$ is the time that the wireless card is connected to network i. $ATP_1$ (reference 300) is the time connected to network 202, $ATP_2$ (reference 302) is the time connected to network 220 and $ATP_3$ (reference 304) is the time connected to network 230. The sum of the activity periods over all the connected networks is called the switching cycle 306. The switching cycle 306 is the time interval for cycling through all networks the node connects to and is a fixed value. It is the aggregation of the activity time periods and switching delay ($\delta_i$), which is the time taken to switch to network i, of all the networks, along with any sleep time the wireless card may take.

Figure 4:
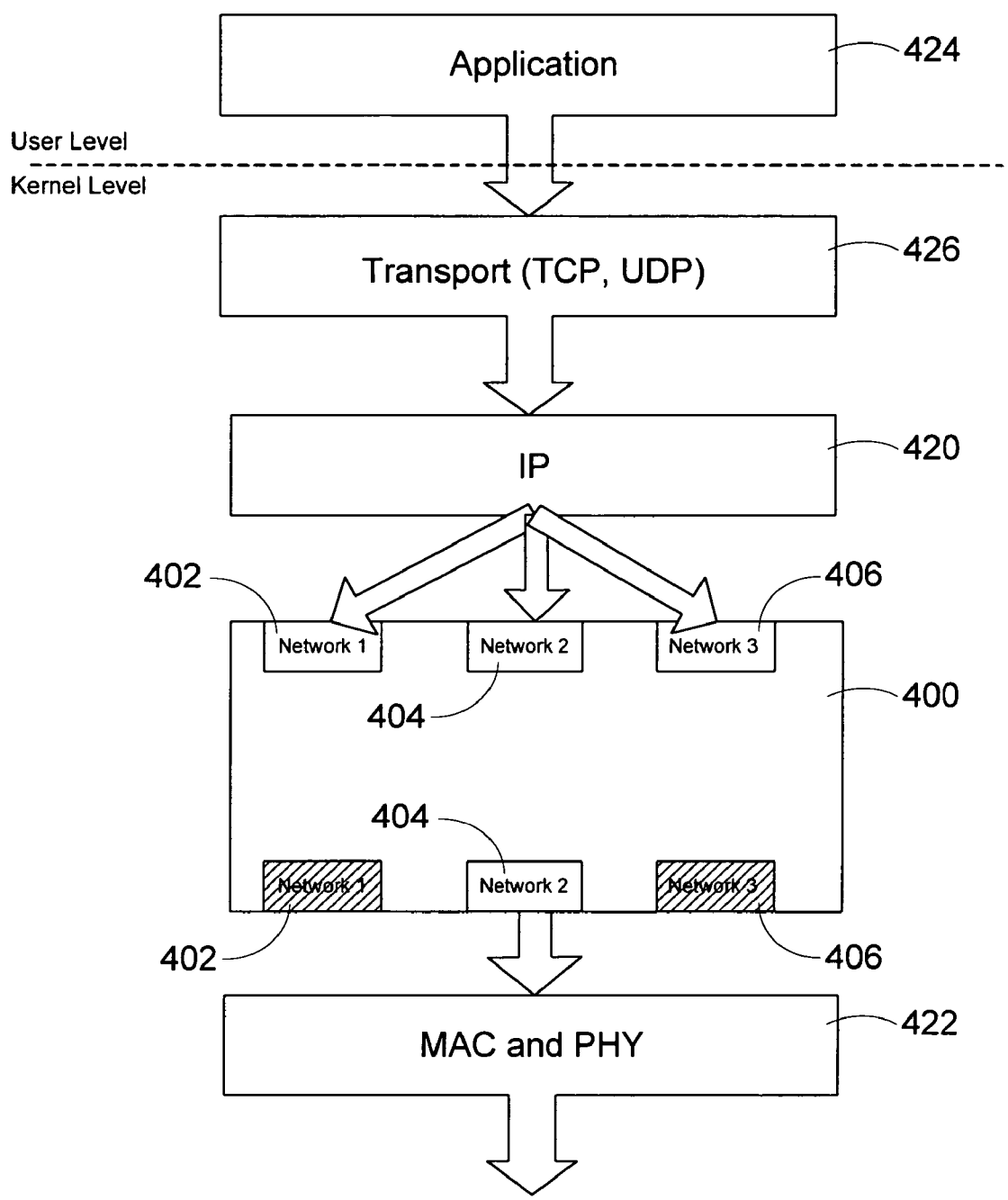
FIG. 4 is a block diagram showing an implementation of the invention in a network stack.

Turning now to FIG. 4, the network interface is virtualized to achieve transparent connectivity across multiple wireless networks. The virtualization of wireless adapters is implemented by protocol driver 400 that is placed below IP layer 420 as an intermediate layer between IP layer 420 and the MAC (Media Access Control) and PHY (Physical) layers 422. The driver 400 exposes the wireless LAN media adapter as multiple "always active" virtual wireless LAN media adapters 402, 404, 406. There is one media adapter per network to which the user wants to stay connected. The IP layer 420 sees all the media adapters, and so the networks, as always active (i.e., connected) even though at the driver level only one network is active at any given time. For example, network 1, 2, and 3 appear to the IP layer 420 as active even though network 2 is currently active at the MAC and PHY layers 422.

The protocol driver 400 is also responsible for switching the wireless card across the different networks and buffering packets for networks that are currently inactive. The upper layers (e.g., transport layer 424 and application layer 426) see the adapters 402, 404, 406 as active even though an adapter may be passive (i.e., inactive) at the driver level. The protocol driver 400 handles application sends and receives over all the connected networks using a buffering protocol as described below.

When the upper layers 424, 426 send a packet to a virtual adapter, the protocol driver 400 sends the packet down to the card if the adapter is active at the driver level. If the adapter is passive at the driver level, the protocol driver 400 buffers the packet with buffers 240 (see FIG. 2). The buffered packets are sent as soon as the corresponding virtual adapter gets activated. This protocol ensures that packets sent on a network are eventually sent to the destination. The maximum delay encountered by such a packet occurs when the packet arrives on a virtual adapter just when the corresponding virtual adapter is inactivated. In this case, the driver will have to wait for the entire switching cycle before it can send the packet. This delay for a packet on network i can be formulated as $\Sigma_{j \neq i}(T_j+\delta_j)+\delta_i$, where $T_j$ is the activity period of netwo j and $\delta_j$ is the time taken to switch to network j. Packets sent to a switching card over network i will be lost if the card is in a different network j at that instant. In addition to sends, the buffering protocol ensures delivery of all packets sent to a wireless card. This requires nodes to buffer packets for wireless cards that are currently unavailable, but which will become available in the near future.

Access points and nodes behave differently. Access points maintain the state of all the cards that are associated to it with a state table 252 (see FIG. 2). Nodes maintain the state of directly reachable cards in any ad hoc network to which they are connected with state table 254. The state table is a 4-tuple state space, containing information about the wireless card's address, its SSID (service set identifier), the time when the wireless card switched from this SSID, and when it is expected to switch back to this network.

The state tables are updated as follows. A card sends a packet to the access point in an infrastructure network, or to all nodes in an ad hoc network, just before switching from the infrastructure network or ad hoc network. This packet informs all the reachable nodes in the current network of its temporary unavailability. The packet also contains information about the duration of absence from the current network and is used to maintain the state table at the nodes and access points. Whenever a node or an access point has a packet to send to another node, the node or access point will first check the state table. If the destination node is currently associated to another network, the packet is buffered. When the state table indicates that the timer of a card has expired, and that it would have switched back to a network, the nodes and access points send the packets buffered for that destination on the corresponding network.

One concern for the buffering protocol is the loss of packets carrying state in the ad hoc network. This packet is broadcast and hence is prone to loss. However, switching cards in ad hoc networks send more than one packet carrying this state per switching cycle. If none of these messages get through, the node buffering packets estimates the activity period of the switching card and keeps probing it. On receiving a response, the node sends the buffered packets.

The protocol also ensures transparent switching because applications using a switching card do not have to know its state. Packets sent to the switching card are all received, though with some extra delay, as long as everybody is honest about their switching period. Note that the buffering algorithm described herein can be implemented without changing the software or hardware at the access points for infrastructure networks. The Power Saving Mode (PSM) feature available in IEEE 802.11 networks is used. The wireless cards "fake" the PSM feature by telling the access points the wireless card is entering the sleep mode when they are actually switching to another network. When a card enters PSM, the access point automatically buffers packets for that card. Although the access point thinks that the card is asleep, the card actually switches and is actively connected to other networks. After the sleep interval, the card connects to the access point and receives all the buffered packets. It should be noted that the switching cycle of the wireless card should be chosen carefully to accommodate the sleep duration on different infrastructure networks.

While the protocol described above works for multiple cards switching between infrastructure networks, it has to be enhanced to handle multiple cards switching in and out of an ad hoc network. In infrastructure networks, the access point stays on the same network all the time. This property ensures that packets transmitted from cards connected to an infrastructure network always get through, and packets to these cards are buffered at the access points if the card is currently not in that network or is sleeping. The performance of the network is affected by the buffering capability of the access point and the switching card. The situation is different for ad hoc networks. As an example, suppose user A and user B are co-workers who belong to the same organization. Further, suppose user B is sharing a presentation with user A over an ad hoc network. Both users are also connected to the corporate infrastructure network using the present invention. A worst case arises when both user A and user B switch synchronously to another network. That is, user B switches to the infrastructure network just when user A switched to the ad hoc network, and vice versa. As a result user A and user B are never in the same network at the same time. As a result, user A and user B will never be able to communicate with each other directly because there is no third party to buffer packets for delivery, whereas in an IS network there is an access point that buffers packets. The users will not be able to communicate with each other over the ad hoc network unless there is another user acting as a relay between A and B within the range of both user A and user B and whose time in the ad hoc network overlaps with the duration of both user A and user B. The switching protocol of the invention is designed to handle such scenarios without the need for another user acting as a relay between A and B.

The key to handling multiple switching devices in ad hoc networks is synchronizing the time during which devices stay in an ad hoc network. To enable devices in an ad hoc network to communicate with any other node in that network, there must exist an overlap in the time periods for which the devices stay connected to the ad hoc network. The method of the invention converges the switching times for all the switching devices in an ad hoc network. It tries to achieve synchronized switching to and from the ad hoc network for all members of that network. In the description that follows, the following variables will be used to describe the method of synchronization: $ATP_i$ (e.g., reference 300-304), $\delta_i$, switching cycle (SC, e.g., reference 306), and $TEATP_i$. $TEATP_i$ is the time elapsed inside $ATP_i$. It can be anywhere from 0 to $ATP_i$. Returning to FIG. 3, $TEATP_1$ is illustrated at 308.

Figure 5:
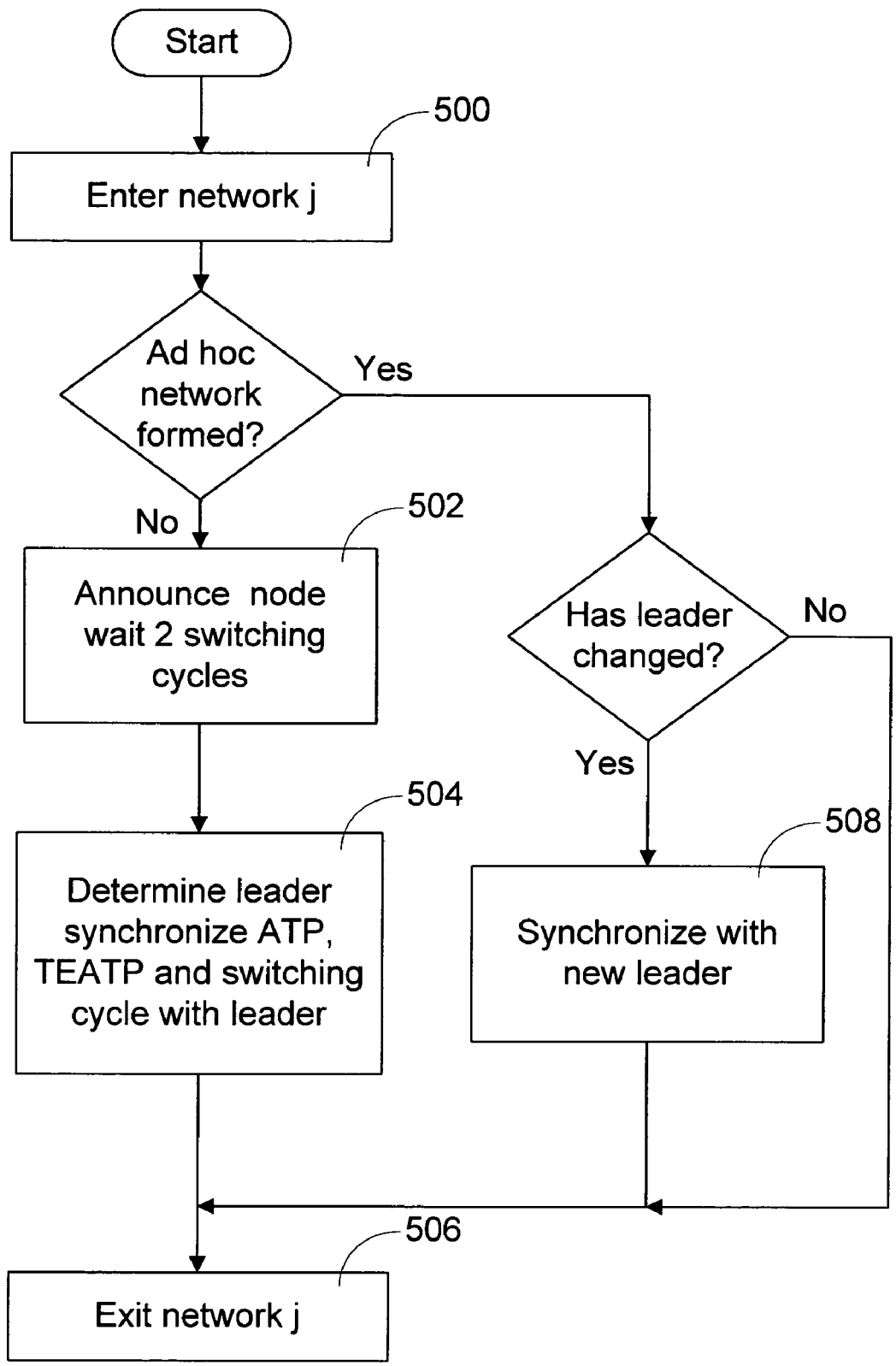
FIG. 5 is a flow chart illustrating the steps to synchronize wireless cards in a network in accordance with the teachings of the present invention.

Turning now to FIG. 5, when a node switches to a network j (step 500) where it has not yet formed an ad hoc network with any other node, it stays on the network for a time of at least 2*SC to hear announcements from other nodes in j. The node also announces itself in the beginning of this interval (step 502). Thereafter the node announces itself every SC time interval in network j. An announcement carries information about $ATP_j$ and $TEATP_j$ for the announcer. Nodes use this announcement to synchronize their time with the leader of the ad hoc group.

In one embodiment, the leader of an ad hoc network is a node with the largest MAC address in that ad hoc network. It is recognized that other ways of selecting a leader can be used. For example, a leader of an ad hoc network may be a node with the smallest MAC address or one having the highest/lowest value of another attribute such as the "time elapsed since boot" sent in the announcement. Each ad hoc network has a leader and the leader may be different in each ad hoc network. If a node hears an announcement from another node with a bigger MAC address, it marks the announcer as its leader and changes its ATP and TEATP to that of the leader (step 504). Since the node knows the SC, which is the same for all nodes, it is able to synchronize with the leader. The nodes then exit network j after the TEATP of the leader is over (step 506) and are synchronized on subsequent cycles in network j. Though a node will synchronize the start time with the leader, it may choose not to synchronize the ATP duration with the leader if it gives different priority to the network with respect to other networks it uses in the switching cycle. The node also stores the MAC address of the leader so that if the leader changes in the future, it can resynchronize itself with a new leader (or become the leader if appropriate). If the announcement is from another node with a smaller MAC address, the receiving node announces its ATP and TEATP after a random time interval in the range of 0 to WaitTime. WaitTime is less than or equal to minimum of the amount of time left to finish the network active time period (i.e. $ATP_j$–$TEATP_j$) of the node that triggered the announcement and the announcer. If nodes on a network stop hearing the leader for 2*SC time interval (i.e. for two full switching cycles), the nodes assume that the leader is gone and resynchronize to the next leader (step 508).

The above protocol aims at providing randomized synchronization among all the ad hoc nodes, with all the nodes synchronously switching into and out of the ad hoc network with a high probability. Moreover, in the absence of faulty nodes and when no announcement messages are lost, if the nodes in the ad hoc network j have the same $ATP_j$ value, then new nodes joining network j will converge on a single $ATP_j$ after a period of time no longer than 2*SC. This is true since a new node joining the network has to wait at most 2*SC time to hear an announcement from another node in the ad hoc network j. This node synchronizes itself with the ad hoc network in the first SC time period, and uses the remaining time to determine the value of $ATP_j$.

One area of concern is that announcement messages are broadcast and are therefore unreliable. As a result, it is possible for the announcement message to not reach all the ad hoc nodes. There might exist nodes that do not receive any announcement messages in a SC time period. Waiting for 2 times the SC time period increases the probability of a node getting synchronized with the leader in case one or more announcements are lost. Fortunately, once a node has successfully joined an ad hoc network j and assigned a value to $ATP_j$, it mainly uses the announcement messages to maintain synchronization to the ad hoc network. As a result, the loss of a few announcement messages does not drastically affect the operation of the invention.

It is possible that nodes with the largest MAC addresses in the two ad hoc networks have overlapping activity time periods. In such a case, a node should not be connected to both the ad hoc networks. Even if a node does connect to the two ad hoc networks, it may not synchronize its ATP values. There are two solutions for this problem. Firstly, the node might try to arbitrate with the leader of each ad hoc network to have non-overlapping ATPs. This solution has repercussions in terms of complexity and performance. To have non-overlapping ATPs, one or both leaders would need to adjust the start time of their ATP and the ATP duration carefully to avoid overlaps in other networks with other leaders. This solution also has a performance hit in that non-leaders would need to resynchronize. We therefore use the second solution. In this solution, the node joins both the networks, but synchronizes its ATP value to only one network based on its priority. The priority of the network could be something that is fixed or adaptive based on criteria such as the amount of traffic seen over the network over a period of time or the amount of packets buffered for it. It remains connected to the other network for the remaining duration, but does not send any announcement messages with its ATP in this network. This ensures connectivity to both the networks. However, the node should not connect to both the networks if their activity periods overlap completely.

Figure 6:
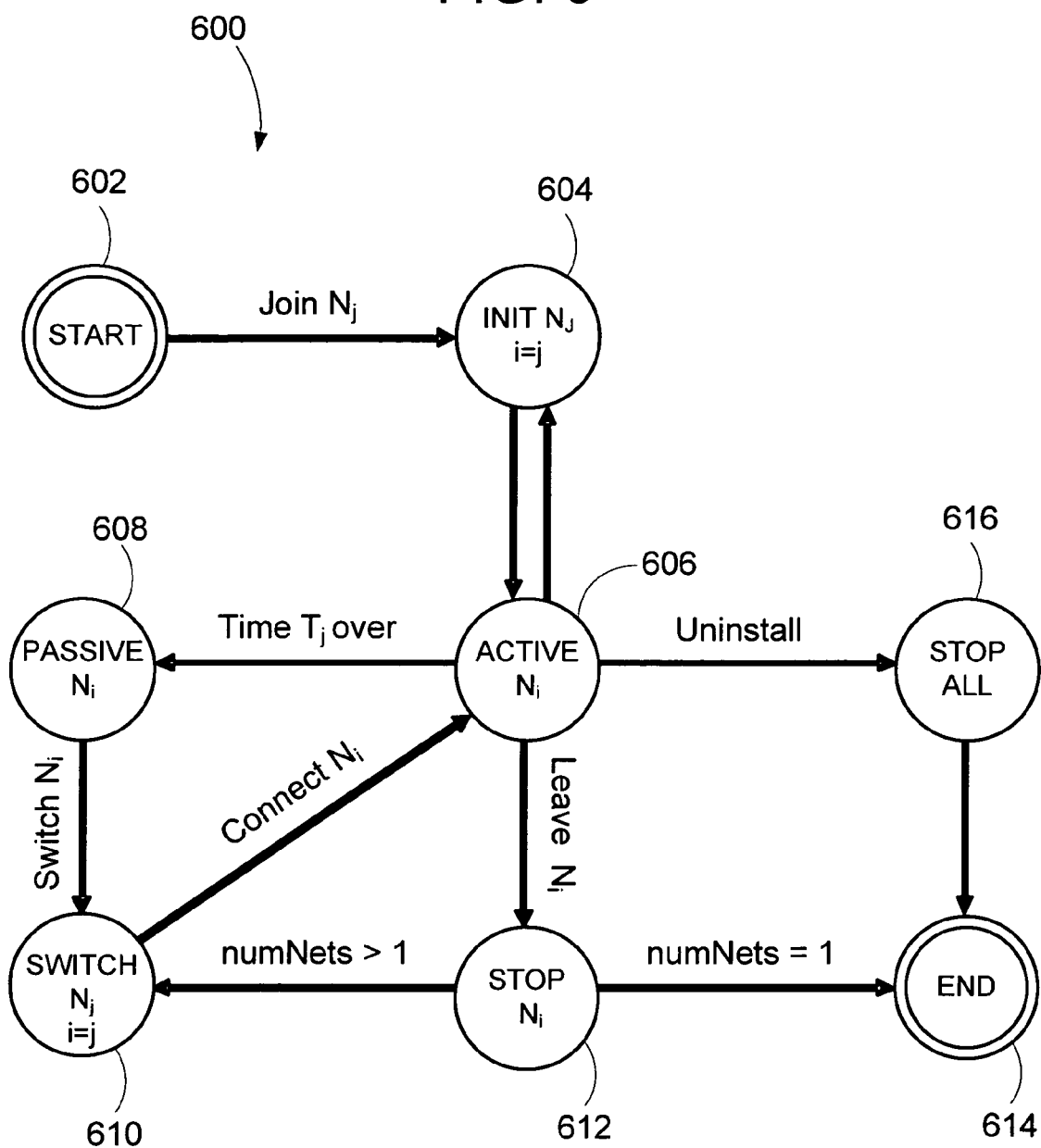
FIG. 6 is a block diagram illustrating a state diagram of a wireless node.

The working of invention is illustrated using the state diagram 600 of FIG. 6. The state diagram comprises eight states. It is assumed that the wireless card is connected to a maximum of n networks $\{N_1, N_2 \ldots N_n\}$. Let numNets denote the number of simultaneous networks to which the card is associated at a particular instant, and $T_i$ denote the activity period, $ATP_i$ (i.e. the time a card stays in a network $N_i$). Given these notations the states in FIG. 6 are explained below.

Wireless cards start in the START state 602 when they are not connected to a wireless network. Additionally, wireless cards that are not using the methods of the present invention remain in the START state 602 and traditional techniques are used to connect to the singular wireless network. These cards might be connected to at most one wireless network. A wireless card enters the INIT $N_j$ state 604 when it wants to join a new wireless network $N_j$. The card enters the INIT $N_j$ state 604 either from the START state 602 or from the ACTIVE $N_i$ state 606 as described below. After entering the INIT $N_j$ state 602, the card sets up a virtual adapter for network N j if it does not exist. After creating the virtual adapter, the card synchronizes with other nodes if N j is an ad hoc network as previously described. Nodes also set up the data structures for buffering and maintaining other information in this state.

In the ACTIVE $N_i$ state 606, the wireless card is connected to wireless network $N_i$. Packets sent over network $N_i$ are sent based on the buffering protocol described above. The packets to be sent over other networks are buffered to be sent when the card is connected to the other networks. After the wireless card has spent a time $T_i$ (e.g., ATP) in network $N_i$, it moves to the PASSIVE $N_i$ state 608. The network stack corresponding to $N_i$ is deactivated. Consequently, all packets sent over $N_i$ are buffered until the corresponding stack is activated later in SWITCH $N_j$ state 610. The state corresponding to $N_i$ is stored, and is used to switch back to this network during the next switching cycle.

The wireless cards enter the SWITCH $N_j$ state 610 when the current network $N_i$ is either removed in the STOP $N_i$ state 612 or the time $T_i$ has expired. In both these cases, cards use the switching strategy to determine the next wireless network, $N_j$, to connect to and the time, $T_j$, the card should stay in it. The card then connects to network $N_j$, activates the corresponding network stack and sends all the packets that were buffered on the network. The card then sets i=j and moves to the ACTIVE $N_i$ state 606.

Cards have the option of leaving a network. Cards enter the STOP $N_i$ state 612 if they want to leave a network $N_i$. All the packets for this network are canceled and the virtual adapter for this network is destroyed. If multiple networks are still being connected to (i.e. numNets>1), the card goes to the SWITCH $N_j$ state 610 and connects to the next network. Otherwise, the card goes to the END state 64.

In the END state 64, the wireless card is connected to at most one network in this state. Traditional techniques are used to connect to the singular wireless network. If the methods of the invention are to be uninstalled, the cards enter the STOP ALL state 616. The packets buffered for all the numNets networks are cancelled and the corresponding virtual adapters are destroyed. The card then moves to the END state 614.

Now that the overall operation of the invention has been described, the details of implementing the invention in a Microsoft® Windows XP® operating system will be described. It is recognized that the invention may be implemented on other operating systems. The implementation in relation to an IEEE 802.11 network shall be used to describe the implementation. Windows XP® provides a Network Driver Interface Specification (NDIS) as an intermediate layer between the network device drivers and the IP layer. NDIS provides transport independence for network card vendors since all the upper layer protocols call the NDIS interface to access the network. The invention has been implemented as a combination of an NDIS intermediate driver 740 and a service 746 (e.g., a daemon). The service 746 implements the buffering and switching logic and passes instructions to the driver 740. The driver 740 implements the mechanics for the buffering and switching. All wireless nodes should have the NDIS intermediate driver and service. However, no changes are required at the wired nodes (e.g., desktop pc 216, etc.). The access points do not require any modification if the IEEE 802.11 Power Save Mode is used as previously described. It should be noted that the method still works if other wireless nodes do not have the driver and service or if the access points do not buffer packets. However, the performance degrades significantly in these cases.

Figure 7:
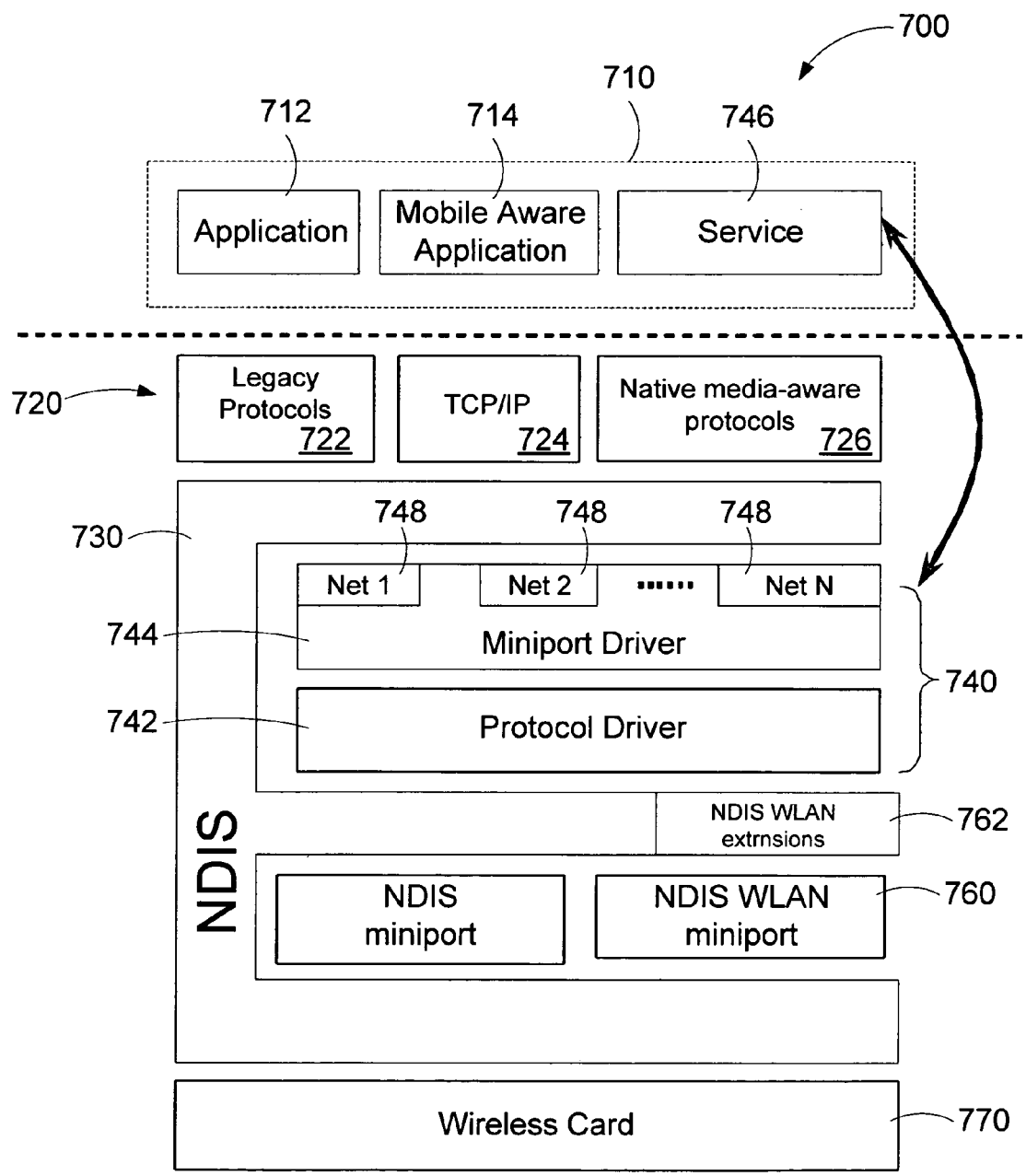
FIG. 7 is a block diagram illustrating an embodiment of the invention in a network stack.

Turning now to FIG. 7, the intermediate driver 740 is added to the NDIS compliant driver layer 730 in the networking stack 700, which is shown in a representation generally similar to the Open Systems Interface ("OSI") networking model. In the OSI model, a networking stack is represented as a set of layers, usually seven layers, such that each layer processes packets without regard to the subsequent processing by other layers. As illustrated in FIG. 7, at the top of the networking stack is the application layer 710, which includes application programs such as application 712 and a mobile-aware application 714. A mobile aware application is one that is informed of and adapts to mobility-initiated changes in the environment (e.g., address and configuration changes due to the node getting connected to a different network, the changes in the speed, latency, congestion, loss, throughput between networks, the location of the host, etc). It uses functions provided by the operating system for this purpose. The application layer 710 sends and receives packets (via intermediate layers not shown in FIG. 7) to the transport protocol layer 720, which is illustrated to have legacy protocols 722, the TCP/IP 724, and native media aware protocols 726. The protocols in the transport protocol layer 720 communicate with the NDIS compliant driver layer 73

NDIS requires the lower edge of a network protocol driver to bind to a network miniport driver (i.e., a driver that directly manages a network interface card (NIC) and provides an interface to higher level drivers) and the upper edge of miniport drivers to bind to a protocol driver. The intermediate driver 740 comprises two components. The components are a protocol driver 742 and a miniport driver 744. The protocol driver 742 binds at the lower edge to the wireless LAN miniport driver 760 with NDIS extensions 762. The miniport driver 744 binds at the upper edge to the network protocols, such as TCP/IP 724. The protocol driver 742 exposes a virtual adapter 748 for each network to which the wireless card 770 is connected. The miniport driver 744 maintains the state for each virtual adapter 748. The advantage of this architecture is that there is an IP stack, and therefore a different IP address, for each network.

The network stack sees each virtual adapter 748 as a different wireless card interface. Each of these virtual adapters should have a distinct MAC address. Although it is possible to do this over an Ethernet interface, many commercially available wireless cards exist that do not forward packets from another MAC address. In such cases, each virtual adapter 748 is given the MAC address of the underlying wireless card. However, this is not desirable since multiple IP addresses are then assigned to the same MAC address. The protocol driver 742 manages the state of the virtual adapters 748. It switches the association of the underlying card across different networks, and buffers packets if the SSID of the associated network is different from the SSID of the sending virtual adapter 748. The protocol driver 742 also buffers packets on the instruction of the Service 746 as described hereinbelow.

The protocol driver also handles packets received by the wireless adapter. A wireless card can send and receive packets only on the currently associated network. A packet received on the wireless adapter is sent to the virtual adapter 748 that is active at that instant. The protocol driver 742 maintains the information about the currently active virtual adapter 748. The miniport driver 744 maintains all the state about each virtual adapter 748. This includes the SSID and operational mode of the wireless network. It is also responsible for handling query and set operations that were otherwise meant for the underlying wireless adapter.

In addition to the intermediate driver 740, the other major software component is the service 746. This service is implemented at the user level and implements the buffering and switching logic. It interacts with other nodes, and passes signaling messages to the intermediate driver 740 to either start or stop a switching and buffering action. The service 746 is responsible for signaling the switching time to the protocol driver 742. This signal denotes the time to switch the card and activate another network. There are various strategies that are used to determine the activity period of a network. These include fixed priority, adaptive traffic, and adaptive buffer.

In the fixed priority strategy, each network gets a fixed preallocated activity period. This time is prioritized, with some networks getting more time than the others based on the importance of the network. The priorities are specified by the user. In the adaptive traffic strategy, each network gets an activity period based on the amount of traffic it has seen over a window of time. In the adaptive buffer strategy, the networks get an activity period proportional to the number of packets buffered by the intermediate driver 740. The benefits of each approach are described below.

The service 746 on the switching node broadcasts a message just before the protocol driver 742 switches the card to another network. This message is received by the services running on other nodes, and indicates the state of the sending card. The service on the receiving nodes indicates this state to its driver 740, which then starts to buffer packets. The service 746 uses I/O Control Codes (ioctls) to interact with the intermediate driver 740. Query and set ioctls are implemented to expose the features of the service and for managing the behavior of the driver 740. It should be noted that the switching signals of the service 746 could be implemented in the driver as an NDIS timer. The switching signals are implemented in the service 746 to enable making switching decisions depending on the state of the other nodes as it is much easier to communicate and maintain network state at the user level than below the network layer. Further, it is much easier to manage the driver from the user level, than to modify the kernel and reinstall the software every time a parameter is changed. However, it is expected that better performance will be achieved if the functionality of most of the service 746 is moved down in the network stack to the intermediate driver 740.

The fixed priority, adaptive traffic, and adaptive buffer switching strategies show different behavior and each of them are useful for different scenarios. For the fixed switching strategy, the network with higher priority gets a larger time slot in which the wireless card remains active. Therefore, the network with a higher priority takes lesser time to complete a FTP transfer. The results of the adaptive strategy methods are similar. The adaptive buffer method adjusts the time it stays on a network based on the number of packets buffered for that network. Since the maximum throughput on an infrastructure network is more than the throughput of an ad hoc network, the number of packets buffered for the infrastructure network is more. Therefore, the FTP transfer completes faster over the infrastructure network as compared to a fixed strategy of 50% in an infrastructure network and 50% in an ad hoc network case. For a similar reason the FTP transfer over the infrastructure network completes faster when using the adaptive traffic strategy of switching. If more traffic is seen sent over the infrastructure network, the method proportionally gives more time to it. Overall, the adaptive strategies work by giving more time to faster networks if there is maximum activity over all the networks. However, if some networks are more active than the others, then the active networks get more time, and an inactive network gets much less time, if any. It is expected that these adaptive strategies will give the best performance if the user has no priority and wants to achieve the best performance over all the networks. However, if the user wants to prioritize his networks, fixed priority strategy is recommended.

Figure 8:
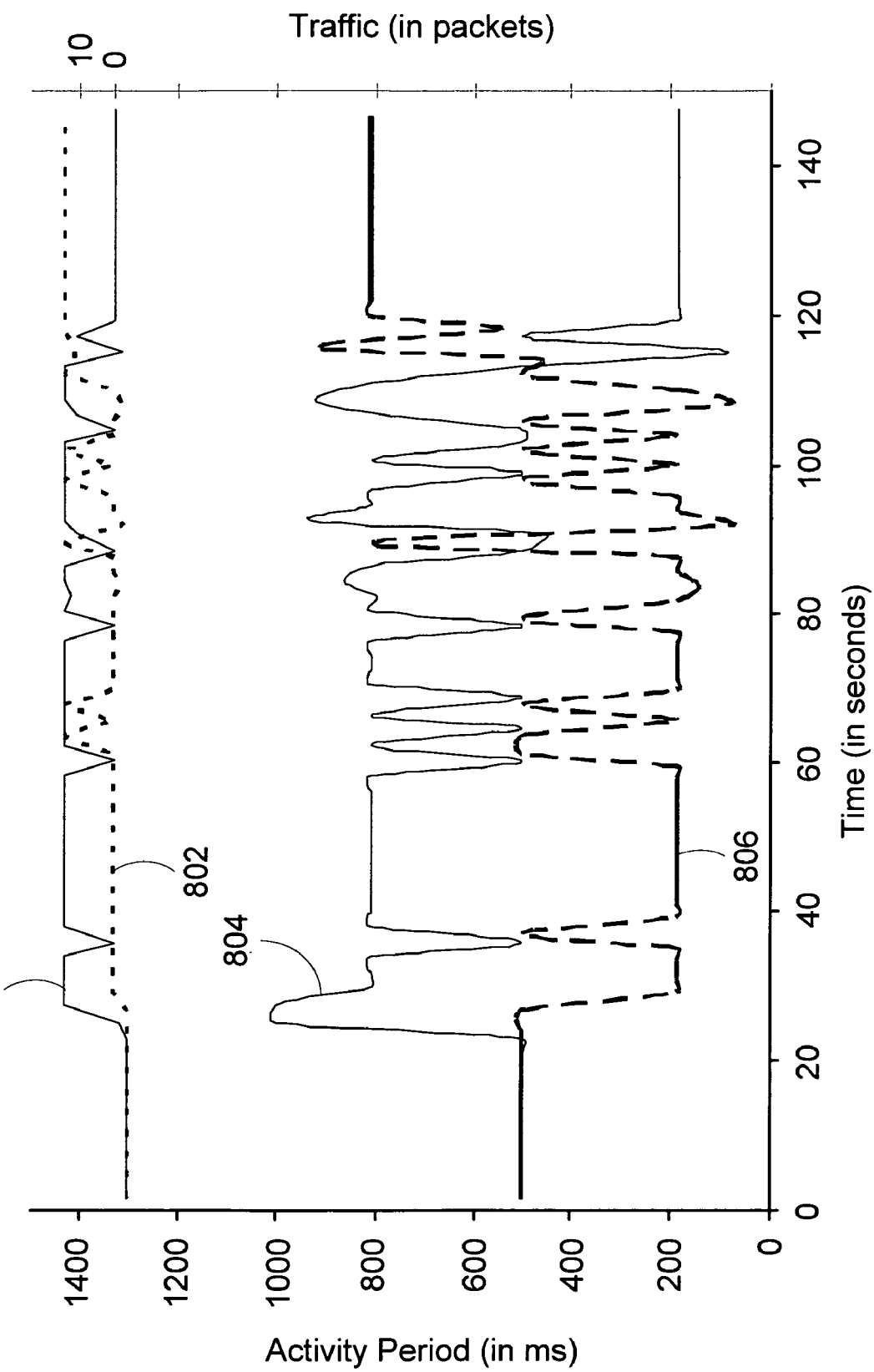
FIG. 8 is a schematic illustrating the correspondence between relative traffic on a network and activity periods in the network using an adaptive buffer switching strategy of the present invention.

The adaptability of the invention is demonstrated in FIG. 8. The adaptive buffer switching strategy is evaluated by running the invention for an ad hoc and an infrastructure network, for 150 seconds. The plots 800, 802 at the top of FIG. 8 show the traffic seen on both the wireless networks. Plot 800 is the traffic for the ad hoc network and plot 802 is the traffic for the infrastructure network. The plots 804, 806 show the corresponding effect on the activity period of each network. Plot 804 is the activity period for the ad hoc network and plot 806 is the activity period for the infrastructure network. As a result of the adaptive switching strategy, the activity period of the networks vary according to the traffic seen on them. Initially when there is no traffic on either network, equal time is given to both networks. After 20 seconds there is more traffic on the ad hoc network, and so more time is allocated to the ad hoc network. The traffic on the infrastructure network is greater than the traffic on the ad hoc network after around 110 seconds. Consequently, the infrastructure network is allocated more time. This correspondence between relative traffic on a network and its activity periods is evident in FIG. 8.

It should be noted that the adaptivity of the methods of the present invention reduces or eliminates the need for zero configuration services presently configured in operating systems such as the wireless zero configuration (WZC) presently configured in Windows XP®. The WZC is a service in Windows XP® that forces connectivity to the first available wireless network in a user's list of "Preferred Networks." The adaptive switching strategies require a user to specify a list of preferred networks, and the card connects to all the networks giving time to a network based on the amount of traffic on it. The current implementation of WZC can be modified to not force network connectivity or to force network connectivity among a plurality of 'Preferred Networks.' Alternatively, it is possible to treat the different virtual miniports as different wireless adapters to the user, and then allow WZC to have a preferred network for each virtual adapter.

It has been previously discussed that buffering over infrastructure networks can be achieved by using the IEEE 802.11 power saving mode. However, many wireless cards use proprietary software, which does not expose any API in Windows to programmatically set the resolution of power save mode for a wireless card. Therefore, the buffering algorithm previously described may not be implementable with these proprietary software wireless cards. This problem may be resolved by buffering packets at the end points of the infrastructure networks, using a similar scheme as described above for ad hoc networks. The service 746 keeps track of the end points of all on-going sessions, and buffers packets if the destination is currently in another network. For wide scale deployment, it is unreasonable to expect Internet servers, such as Yahoo or Amazon or the like, to do the buffering for nodes, and it is practical to implement the buffering algorithm at the access points as described above.

It should be noted that some packets destinations might not be on any of the networks to which the wireless card is connected. If the destination is not on any of the connected networks, a default gateway is chosen to send the packets. This is done even if the network with the gateway node is currently inactive. To send packets only on gateways of currently active networks, a flag is used to indicate when the network with the default gateway is active. This ensures that packets routable on the currently active network are not buffered.

The invention requires network dependent IP addresses for the different virtual adapters exposed by it. However, this may be a difficult constraint in existing operating systems. For example, an ad hoc network works in Windows® by assigning the node an autonet address. (i.e. 169.254.x.y address). In Windows XP®, a node is assigned an autonet address only if it is unable to get a proper DHCP (dynamic host configuration protocol.) address. This approach works fine if the network card stays in the ad hoc node for some time. However, the network card operating in accordance with the invention periodically switches between networks. If one of the networks is an infrastructure network, or a network with a DHCP server, the DHCP request gets through and the ad hoc node gets an IP address outside the range of autonet addresses. This can be fixed by manually allocating IP addresses for the virtual miniports. A better solution is to allow ad hoc nodes to get an autonet address without first attempting to get a routable DHCP address.

A key to the success of the invention is a short delay when switching across networks. However, commercially available wireless cards do not associate to more than one network at a time, and perform the entire 802.11 association procedure every time they switch to a network. We carried out a more detailed analysis of the steps when associating to an 802.11 network. There is a significant overhead when switching from one network to another network. The delay is on the order of 3 to 4 seconds from the time the card finishes associating to an ad hoc network, after switching from an infrastructure network, to the time it starts sending data. Our investigations revealed that the cause of this delay is the media disconnect and connect notifications to the IP stack. The IP stack damps the media disconnect and connect for a few seconds to protect itself and its clients from spurious 'media disconnects' and 'media connects.' The spurious connects and disconnects can be generated by network interface cards due to a variety of reasons ranging from buggy implementations of the card or switch firmware to the card/switch resetting itself to flush out old state. IP was designed to damp the media disconnect and connect notifications for some time before rechecking the connectivity state of the adapter and taking the action commensurate with that state.

In the case of the present invention, the switching between the networks is deliberate and meant to be hidden from higher protocols such as IP and its clients. We hide this switching by having the intermediate driver 740 trap the 'media disconnect' and 'media connect' messages when it switches between networks. Since the intermediate driver 740 is placed below IP, it can prevent the network layer from receiving the media disconnect and media connect messages. This results in a significant improvement in the switching overhead. An extra delay of 3 to 4 seconds when switching to an ad hoc network was reduced to approximately 100 milliseconds, which is attributed to the firmware of the wireless cards. Masking the 'media connect' and 'media disconnect' messages makes it no longer possible to accurately represent the active/passive state of the virtual adapters. As a result of the masking, all of the adapters are visible to the IP layer as active. It should be noted that the state of each miniport instance is however known to the intermediate driver 740.

The performance and deployment of the invention may be further improved. Good performance depends on low switching delays. It was previously discussed that the switching overhead can be reduced by an order of magnitude by trapping media disconnects. However, the switching delay is still in the order of hundreds of milliseconds, and this delay can be further reduced. The main cause of the switching overhead is the 802.11 protocol, which is executed every time a card switches to a network. The card believes that it has disassociated from the previous network and re-starts association. Furthermore, existing wireless cards do not store state for more than one network in the firmware, and wireless cards require a firmware reset when changing the mode from ad hoc to infrastructure and vice versa. Most of these problems can be fixed without breaking the IEEE 802.11 protocol. Since switching is forced by the invention, we recommend that the firmware and driver of wireless cards export the stored state for the currently associated network. With this, the protocol driver 742 only needs to context switch the card across various networks, by loading and saving state of a wire-less network. The only overhead on switching will then be synchronization with the current wireless network. This can be done reactively with the card requesting a synchronization beacon when it switches to a network.

With respect to security, the IEEE 802.1X is a centralized authentication protocol that is becoming increasingly popular for enterprise wireless LANs. The overhead of the IEEE 802.1X authentication protocol was measured and it was found to be approximately 600 ms. It is clear that the wireless card should be prevented from going through a complete authentication procedure every time it switches across IEEE 802.1X enabled networks. The authentication cycles are eliminated by storing the IEEE 802.1X state in the intermediate driver 740. The intermediate driver 740 uses this state instead of redoing the authentication procedure every time a switch is made. Furthermore, the IEEE 802.11 standard recommends an optimization called 'Preauthentication' for the access points. Preauthentication works by having the access points maintain a list of authenticated nodes. When implemented, this optimization will eliminate the authentication overhead every time the wireless card switches to an 802.1X enabled network.

In an alternate embodiment, the concept of leader election and synchronization with a leader is not required. This embodiment uses many of the concepts of the previous embodiments but does not require all of the concepts. For example, the adaptive switching capability and the ability to vary the time spent on different networks described previously are not required. Additionally, this embodiment controls the switching of the virtual adapters, implements a different buffering strategy than previously described, and sends its own control traffic instead of the control traffic previously described. This embodiment of the invention shall be described using the IEEE 802.11 standard and the protocol driver 400 (or the intermediate driver 740) of the previous embodiments described. It should be noted that other wireless protocols may be used. The IEEE 802.11 standard divides the available frequency in orthogonal (i.e., non-overlapping) channels. The IEEE 802.11a standard supports thirteen orthogonal channels. The 802.11b standard has 11 channels in the 2.4 GHz spectrum, 3 of which are orthogonal. The 802.11a standard has 13 orthogonal channels in the 5 GHz spectrum. Packet transmissions on the orthogonal channels do not interfere with each other if the communicating nodes (e.g., wireless cards) on them are reasonably separated. Studies have shown that a reasonable separation of at least twelve inches is sufficient for most hardware.

Figure 9:
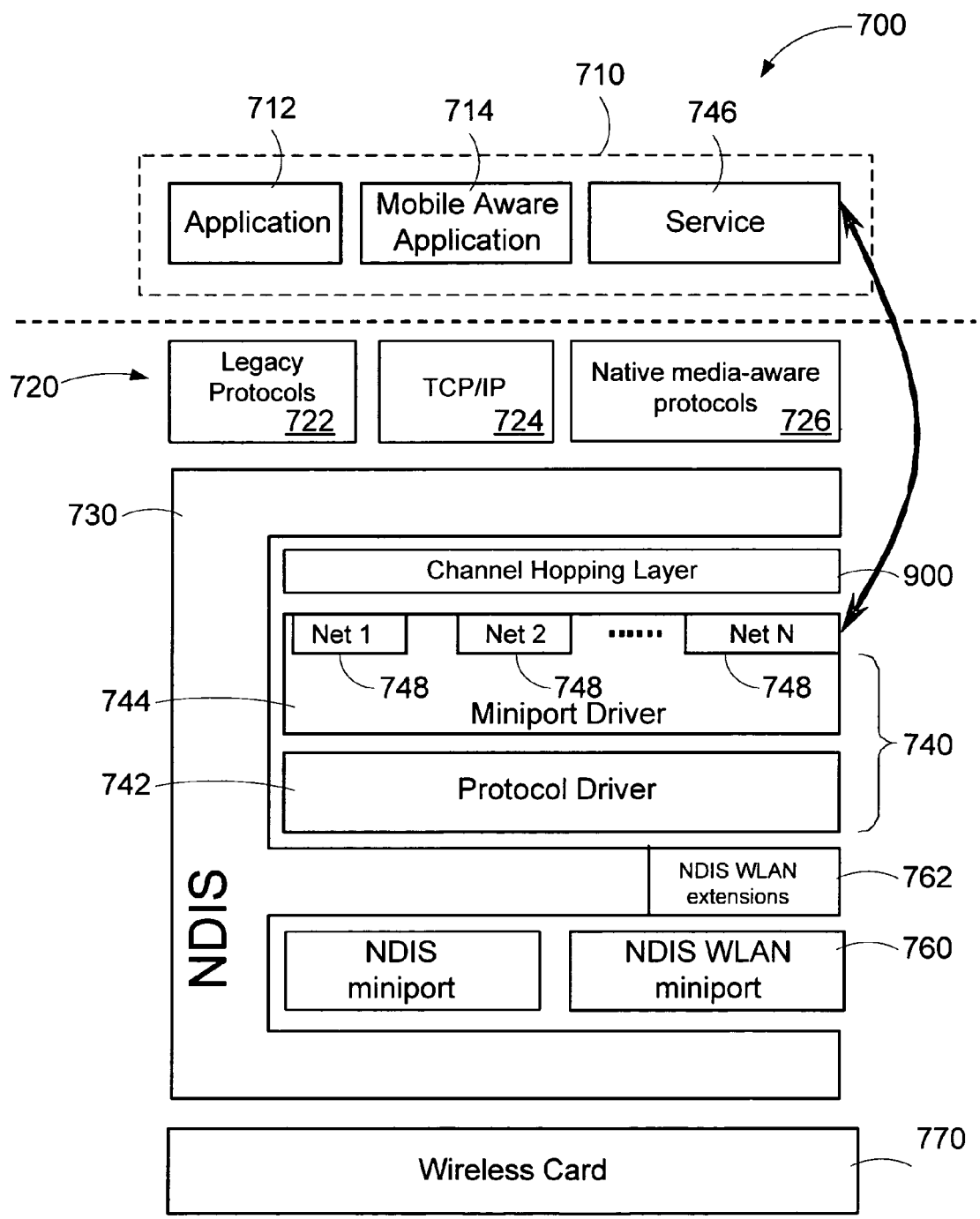
FIG. 9 is a block diagram showing an alternate embodiment of the invention in a network stack.

Turning to FIG. 9, the implementation of this embodiment of the invention is illustrated in the Microsoft® Windows XP® operating system. It is recognized that the invention may be implemented on other operating systems. A channel hopping layer 900 in communication with the virtual adapters 748 is added above the intermediate driver 740. The channel hopping layer 900 sends to and receives packets from application layer 710 and transport protocol layer 720 via the NDIS compliant driver layer 730. The channel hopping layer communicates with the intermediate layer 740 and directs it to switch to different channels in accordance with the nodes' channel hopping schedule as described below. While the channel hopping layer is shown as a separate layer, it may be integrated with other layers such as miniport driver 744, NDIS compliant driver layer 730, and the like.

This embodiment works in a single-hop or multi-hop environment and supports multi-hop flows. A slot is the time spent on a single channel. A channel hopping schedule is a list of channels that a node places to switch to in subsequent slots and the time at which it plans to make each switch. Each node maintains a list of the channel hopping schedules for all other nodes with which it is aware. Note that the information in the list may be out-of date; it just takes a longer period of time for a node to overlap in a slot with another node whose information is out of date with the node. A node is allowed to follow a channel hopping schedule that overlaps for a portion of the time with a node A and another portion of time with a second node B.

Each wireless card switches across multiple channels so that multiple flows within interfering range of each other can simultaneously occur on orthogonal channels. This results in significantly increased network capacity when network traffic patterns consist of such flows.

Packets that are to be sent to other nodes are maintained in per-neighbor FIFO queues. Using FIFO queues maintains standard higher-layer assumptions about in-order delivery. The per-neighbor FIFO queues are maintained in a priority queue ordered by perceived neighbor reachability. At the beginning of a slot, packet transmissions are attempted in a round-robin manner or the like among all flows. If a packet transmission to a particular neighbor fails, the corresponding flow is reduced in priority until a period of time equal to one half of a slot duration has elapsed. This limits the bandwidth wasted on flows targeted at nodes that are currently on a different channel to at most two packets per slot whenever a flow to a reachable node also exists. Packets are only drawn from the flows that have not been reduced in priority unless only reduced priority flows are available.

Nodes using this embodiment of the invention may be on different channels. To account for this, broadcast packets transmitted in any one slot are likely to reach only some of the nodes within physical communication range. The network stack layer as described above handles this issue through repeated link-layer retransmission of broadcast packets enqueued by higher layers. Although broadcast packets sent this way may reach a different set of nodes than if all nodes had been on the same channel, this has not been found to present a difficulty to protocols employing broadcast packets; as few as six transmissions allows DSR (Dynamic Source Routing—a protocol that relies heavily on broadcasts) to function well. Such behavior is not surprising since broadcast packets are known to be less reliable than unicast packets, and so protocols employing them are already robust to their occasional loss. However, it should be noted that the retransmission of packets may not be compatible with all uses of broadcast, such as its use to do synchronization. Note that the selection of six transmissions was derived for a thirteen channel network. Deploying the invention in an environment with a different number of channels might require the choice of six transmissions to be changed.

The IEEE 802.11 standard recommends the use of a Request to Send (RTS) and Clear to Send (CTS) mechanism to control access to a channel. A node desiring to transmit a packet must sense the medium free for a DCF interframe space (DIFS). The sending node then broadcasts an RTS packet seeking to reserve the medium. If the intended receiver node hears the RTS packet, the receiver node sends a CTS packet. The CTS packet reserves the medium in the neighborhood of the receiver, and neighbors do not attempt to send a packet for the duration of the reservation. A node with a packet to send may discover that a neighbor is not present on a given channel when no CTS is received in response to a transmitted RTS. However, the node may very well be present on another channel, in which case the packet should still be delivered. To handle such an event, the packet in the packet queue is initially retained. Packets are dropped only when the channel hopping layer 900 gives up on all packets to a given destination. The dropping of an entire flow occurs only when transmission of a packet to the destination node has failed to occur for an entire cycle of the channel hopping schedule. After a flow to a destination has been garbage collected, new packets with the same destination inserted in the queue are assigned to a new flow and the flow is attempted in the normal manner.

The packet scheduling policy described above is simple to implement and yields good performance in the typical case that node schedules are known and information about node availability is accurate. A potential drawback is that a node crash (or other failure event) can lead to a number of wasted RTSs to the failed node.

The channel hopping schedule is best understood by first describing the data structure used to represent the channel hopping schedule. The channel hopping schedule must capture a given node's plans for channel hopping in the future, and there is obvious overhead to representing this as a very long list. Instead of using a long list, the channel hopping schedule is compactly represented as a current channel and a rule for updating the channel. In one implementation, the channel hopping schedule is represented as a set of 4 (channel, seed) pairs. Experimental results show that 4 pairs are sufficient to give good performance. Other sets of (channel, seed) pairs may be used. The (channel, seed) pair is represented as $(x_i, a_i)$. The channel $x_i$ is represented as an integer in the range [0, 12] in the IEEE 802.11a operating environment as there are 13 orthogonal channels. The seed $a_i$ is represented as an integer in the range [1, 12] where "1" represents the minimum channel hop and "12" represents the maximum channel hop in the operating environment. Each node iterates through all of the channels in the current schedule, switching to the channel designated in the schedule in each new slot. The node then increments each of the channels in its schedule using the seed, $$x_i \leftarrow (x_i + a_i) \bmod 13$$

and repeats the process. The channel scheduling mechanism has three simultaneous design goals: allowing nodes to be synchronized in a slot, infrequent overlap between nodes that do not have data to send to each other, and ensuring that all nodes come into contact occasionally (to avoid a logical partition). To achieve these goals, a simple mathematical technique, addition modulo a prime number is used. Note that the use of addition modulo a prime number to construct the channel hopping schedules doe not restrict the invention to scenarios where the number of channels is a prime number. If the number of channels is not a prime number, one could straightforwardly use a larger prime as the range of $x_i$ and then map down to the actual number of channels using a modulus reduction. While the mapping may have some bias to certain channels, the bias could be made arbitrarily small by choosing a sufficiently large prime number.

An additional slot is used to prevent logical partitions (i.e., a condition where two nodes in communication range are unable to communicate). After a node has iterated through every channel on each of its 4 slots, it switches to a parity slot whose channel assignment is given by $x_{parity} = a_1$. The term "parity slot" is derived from the analogy to the parity bits appended at the end of a string in some error correcting codes. The term "cycle" refers to the time to iterate through all the slots, including the parity slot. In one implementation, the time is 530 ms.

Figures 10, 11:
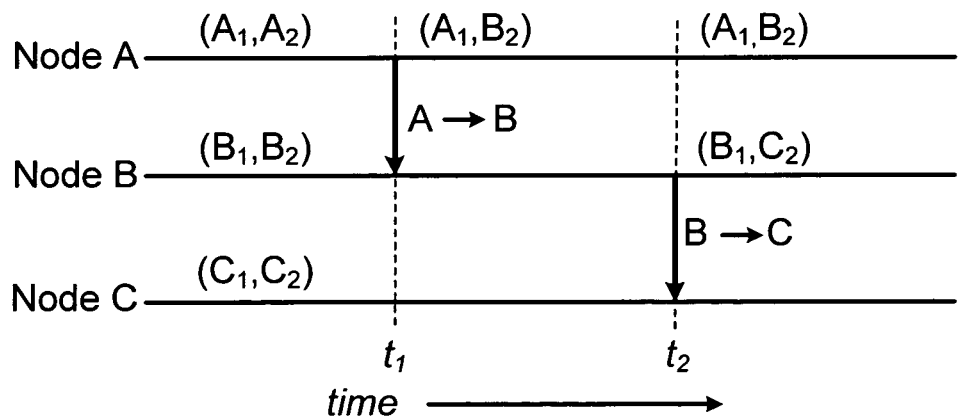
FIG. 10 is an illustration of channel hopping schedules for two nodes in accordance with the teachings of the present invention.
FIG. 11 is an illustration showing how nodes may experience problems when using a naive synchronization scheme.

In FIG. 10, possible channel schedules for two nodes in the case of 2 slots and 3 channels are illustrated. Nodes switch from one slot to the next according to a fixed schedule (e.g., every 10 ms). In FIG. 10, node A and node B are synchronized in one of their two slots (i.e., they have identical (channel, seed) pairs), and they also overlap during the parity slot. The field of the channel schedule that determines the channel during each slot is shown in bold. Each time a slot reappears, the channel is updated using the seed. For example, node A's slot 1 initially has (channel, seed)=(1, 2). After the slot time has passed, node A switches to slot 2. Slot 2 of node A has an initial (channel, seed)=(2, 1). The next time slot 1 is entered, the channel is updated by adding the seed to it mod 3 (mod 3 because in this example, there are 3 channels). The resulting channel is given by (1+2) mod 3=0. The next time slot 1 is entered, the channel is again updated by adding the seed to it mod 3. The resulting channel is given by (0+2) mod 3=2. The next time slot 2 is entered, the channel is updated and the resulting channel is given by (2+1) mod 3=0. The next time slot 2 is entered, the resulting channel is given by (0+1) mod 3=1.

As previously indicated, nodes switch from one slot to the next according to a fixed schedule. However, the decision to switch channels may occur while a node is transmitting or receiving a packet. In this case the switch to a different channel is delayed until after the transmission and ACK (or lack thereof) have occurred.

Nodes learn each other's schedules by periodically broadcasting their channel schedule and offset within this cycle. The IEEE 802.11 Long Control Frame Header format is used in one implementation to embed both the schedule and the node's current offset. The format contains six unused bytes. Two of the unused bytes are used to embed the current offset with respect to the cycle and the remaining bytes are used to embed the (channel, seed) pairs. The channel hopping layer 900 at each node schedules one of these packets for broadcast once per slot. Nodes also update their knowledge of other nodes' schedules by trying to communicate and failing. Whenever a node sends an RTS to another node, and that node fails to respond even though it was believed to be in this slot, the node sending the RTS updates the channel schedule for the other node to reflect that it does not currently know the node's schedule in this slot.

A node may change its own schedule. Generally, there is one slot where nodes are not permitted to change the seed except during a parity slot. For example, if a node is not permitted to change the seed in its first slot, Nodes will always overlap in either the first slot or the parity slot, and hence will always be able to exchange channel schedules within a moderate time interval. Schedules are updated in two ways: each node attempts to maintain that its slots start and stop at roughly the same time as other nodes, and that its channel schedule overlaps with nodes for which it has packets to send. The information needed for this synchronization is embedded within the Long Control Frame Header.

At a high level, each node achieves overlap with nodes for which it has traffic straightforwardly, by changing part of its own schedule to match that of the other nodes. However, a number of minor decisions must be made correctly in order to achieve this high level goal.

Nodes recompute their channel schedule right before they enqueue the packet announcing this schedule in the NIC (e.g., at least once per slot). In a naive approach, this node could examine its packet queue, and select the (channel, seed) pairs that lead to the best opportunity to send the largest number of packets. However, this approach ignores the interest this node has in receiving packets and in avoiding congested channels. An example of the kind of problem that might arise if one ignores the interest in receiving packets is illustrated in FIG. 11. Here, A synchronized with B, and then B synchronized with C in such a way that A was no longer synchronized with B. This could have been avoided if B had used its other slot to synchronize with C, as it would have done if it considered its interest in receiving packets.

To account for a node's interest in receiving packets, per-slot counters are maintained for the number of packets received during the previous time the slot was active (ignoring broadcast packets). Any slot that received more than 10 packets during the previous iteration through that slot is labeled a receiving slot. Note that the number "10" for the number of packets received is a tunable parameter. The number ten has been found to be a good number in an environment of 54 Mbps and 10 msec switching times. A different number may be used with other network parameters. If all slots are receiving slots, any one is allowed to be changed. If some slots are receiving slots and some are not, only the (channel, seed) pair on a non-receiving slot is allowed to be changed for the purpose of synchronizing with nodes in which packets are to be sent.

To account for channel congestion, the (channel, seed) pairs of all the nodes that sent us packets in a given slot are compared with the (channel, seed) pairs of all the other nodes in our list of channel schedules. If the number of other nodes synchronized to the same (channel, seed) pair is more than twice as many as this node communicated with in the previous occurrence of the slot, an attempt is made to de-synchronize from these other nodes. De-synchronization just involves choosing a new (channel, seed) pair for this slot. In experiments, this de-synchronization mechanism was both necessary and sufficient to prevent the nodes from all converging to the same set of (channel, seed) pairs.

The final constraints are used to moderate the pace of change in schedule information. Each node only considers updating the (channel, seed) pair for the next slot, never for slots further in the future. If the previous set of criteria suggests updating some slot other than the next slot, that decision is delayed. Given these constraints, picking the best possible (channel, seed) pair simply requires considering the choice that synchronizes with the set of nodes for which a node has the largest number of queued packets. Additionally, the (channel, seed) pair for the first slot is only allowed to be updated during the parity slot, which helps to prevent logical partition.

This strategy naturally supports nodes acting as sources, sinks, or forwarders. A source node will find that it can assign all of its slots to support sends. A sink node will find that it rarely changes its slot assignment, and hence nodes sending to it can easily stay synchronized. A forwarding node will find that some of its slots are used primarily for receiving; after re-assigning the channel and seed in a slot to support sending, the slots that did not change are more likely to receive packets, and hence to stabilize on their current channel and seed as receiving slots for the duration of the current traffic patterns. This technique of synchronization is termed "partial synchronization."

To avoid requiring modifications to hardware or the network stack, the channel hopping layer 900 buffers packets below the network layer, but above the NIC device driver. To maintain control over transmission attempts, the NIC is configured to buffer at most one packet at a time, and to attempt exactly one RTS for each packet before returning to the channel hopping layer 900. By observing NIC-level counters before and after every attempted packet transmission, a user is able to determine whether a CTS was heard for the packet, and if so, whether the packet was successfully transmitted and acknowledged.

For efficiency reasons, the IEEE 802.11 Long Control Frame Header format to broadcast channel schedules and current offsets, rather than using a full broadcast data packet. The most common control frames in IEEE 802.11 (RTS, CTS, and ACK) use the alternative short format. The long format was included in the IEEE 802.11 standard to support inter-operability with legacy 1-Mbps and 2-Mbps DSSS systems. The format contains 6 unused bytes; we use 4 to embed the 4 (channel, seed) pairs, and another 2 to embed the offset within the cycle (i.e., how far the node has progressed through the 530 ms cycle).

Note that the beaconing mechanism used in IEEE 802.11 ad-hoc mode for associating with a Basic Service Set (BSS) works unchanged in the presence of the invention. A newly-arrived node can associate to a BSS as soon as it overlaps in the same channel with any already-arrived node.

The performance of this embodiment of the invention was compared to the commonly used single-channel IEEE 802.11a protocol. The simulated environment comprises a varying number of nodes in a 200 m×200 m area. All nodes in a single simulation run use the same MAC, either that of the invention or IEEE 802.11a. All nodes are set to operate at the same raw data rate, 54 Mbps. Thirteen usable channels in the 5 GHz band are assumed. The implementation of the invention is configured to use 4 seeds, and each slot duration is 10 ms. All seeds are randomly chosen at the beginning of each simulation run.

Throughput is primarily measured under a traffic load of maximum rate UDP flows. In particular, a Constant Bit Rate (CBR) flows of 512 byte packets sent every 50 μs was used. This data rate is more than the sustainable throughput of IEEE 802.11a operating at 54 Mbps.

A channel switch delay of 80 μs is used. This choice is based on recent work in solid state electronics on reducing the settling time of the Voltage Control Oscillator (VCO). Switching the channel of a wireless card requires changing the input voltage of the VCO, which operates in a Phase Locked Loop (PLL) to achieve the desired output frequency. The delay in channel switching is due to this settling time. The specification of Maxim IEEE 802.11b Transceivers shows this delay to be 150 μs. A more recent work shows that this delay can be reduced to 40-80 μs for IEEE 802.11a cards.

Figure 12:
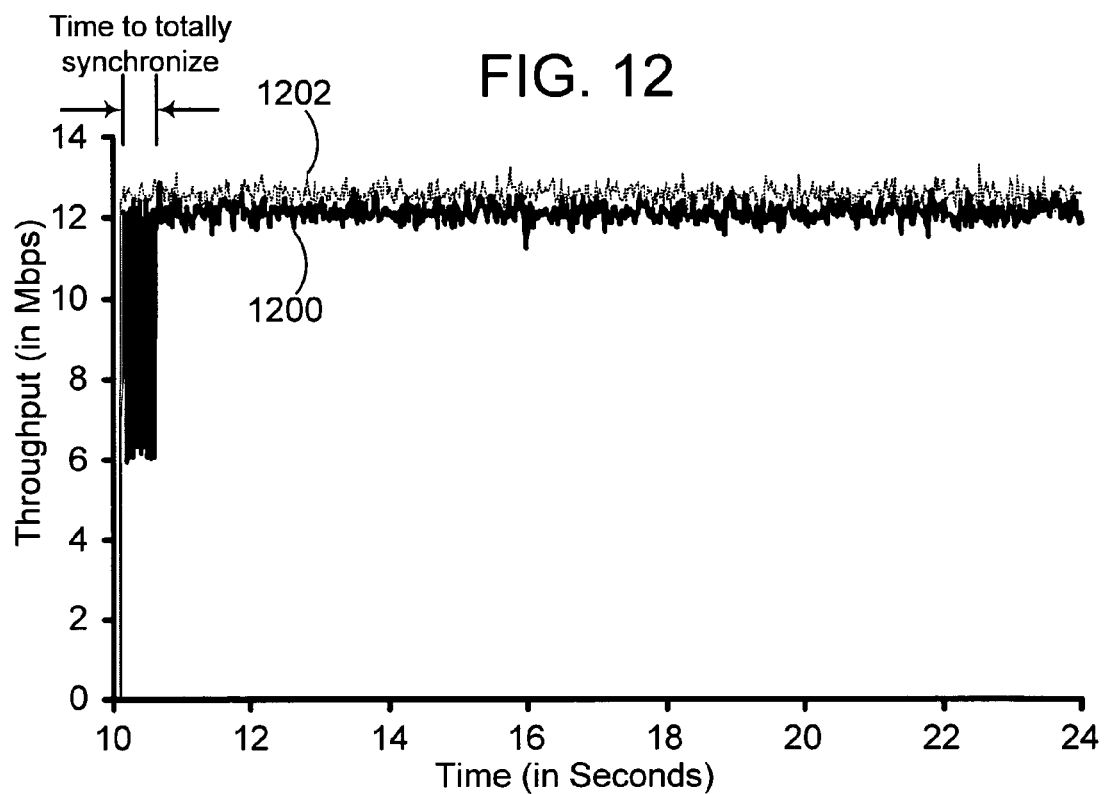
FIG. 12 is a graph illustrating the overhead of switching and synchronizing of the invention and the IEEE 802.11a protocol.

Turning now to FIG. 12, the overhead of successfully initiating a CBR flow between two nodes within communication range of each other was measured. The first node initiates the flow just after the parity slot. This incurs a worst-case delay in synchronization, because the first of the four slots will not be synchronized until 530 ms later.

FIG. 12 shows the moving average over 20 ms of the throughput at the receiver node. Curve 1200 is the moving average for the invention and curve 1202 is the moving average for the single-channel 802.11a protocol. The sender quickly synchronizes with the receiver on three of the four slots, as it should, and on the fourth slot after 530 ms. The figure shows the throughput while synchronizing (oscillating around ¾ of the raw bandwidth), and the time required to synchronize. After synchronizing, the channel switching and other protocol overheads lead to only a 400 Kbps penalty in the steady-state throughput relative to IEEE 802.11a. This penalty conforms to the overheads in this embodiment of the invention: a node spends 80 μs every 10 ms switching channels (80 μs/10 ms=0.008), and then must wait for the duration of a single packet to avoid colliding with pre-existing packet transmissions in the new channel (1 packet/35 packets=0.028). Adding these two overheads together leads to an expected cumulative overhead of 3.6%, which is in close agreement with the measured overhead of (400 Kbps/12 Mbps)=3.3%.

Note that the throughput reaches a maximum of only 13 Mbps, although the raw data rate is 54 Mbps. This low utilization can be explained by the IEEE 802.11a requirement that the RTS/CTS packets be sent at the lowest supported data rate, 6 Mbps, along with other overheads.

Figure 13:
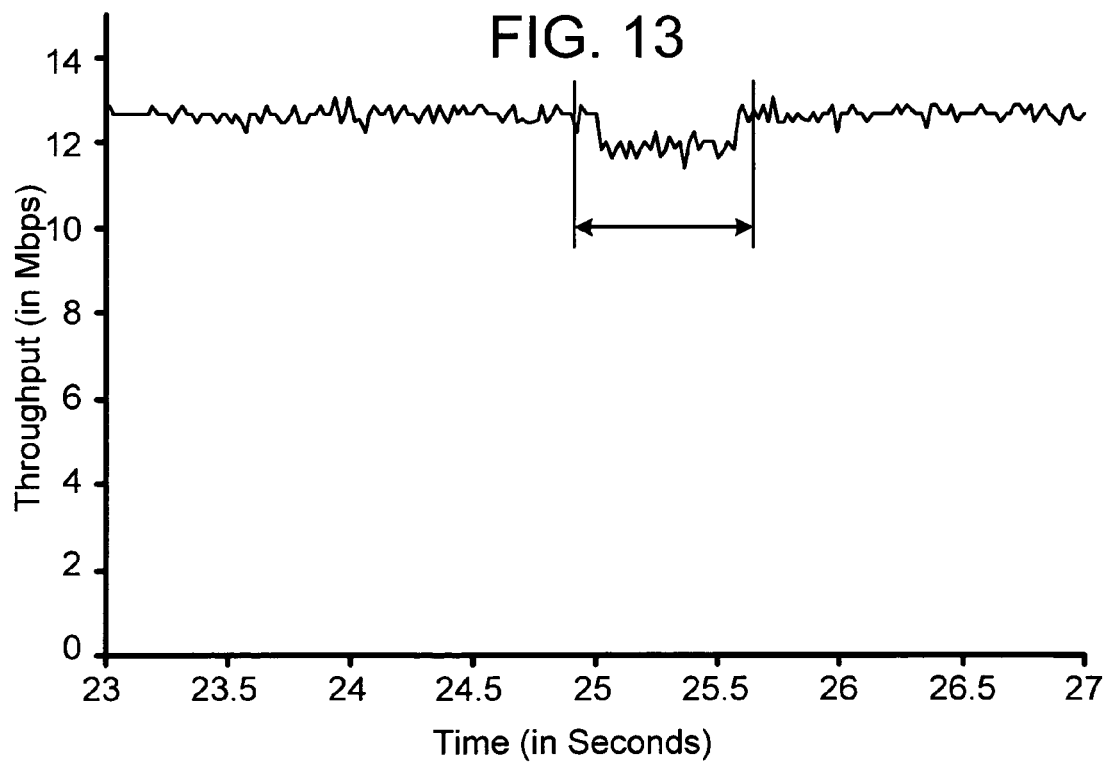
FIG. 13 is a graph illustrating the overhead of the invention when a sending node attempts to contact an absent recipient node.

Note that the invention requires more re-transmissions than IEEE 802.11 to prevent logical partitions. These retransmissions waste bandwidth that could have been dedicated to a node that was present on the channel. To quantify this overhead, a CBR flow was initiated between two nodes, the system was allowed to quiesce, and then a send was initiated from the first node to a non-existent node. FIG. 13 shows the moving average over 80 ms of the throughput. The figure shows that the sender takes 530 ms to timeout on the non-existent node. During this time the throughput drops by 550 Kbps, which is a small fraction (4.6%) of the total throughput.

Figure 14:
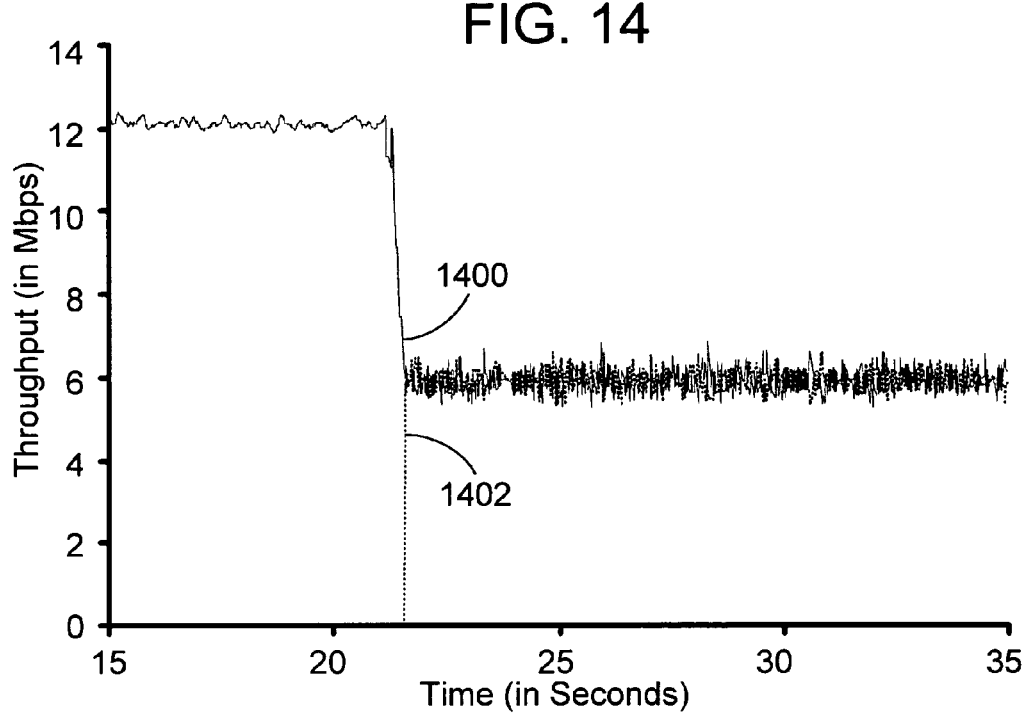
FIG. 14 is a graph illustrating the ability of the invention to share bandwidth between a plurality of data flows.

Turning now to FIG. 14, the ability of the invention to fairly share bandwidth between two flows, and to quickly achieve this fair sharing is quantified. To measure this, Node 1 is started to send a maximum rate UDP flow to Node 2. At 21.5 seconds, Node 1 starts a second maximum rate UDP flow to Node 3. FIG. 14 presents the moving average over 140 ms of the throughput achieved by both receivers. Curve 1400 is the throughput of Node 2 and curve 1402 is the throughput of Node 3. It can be seen that the bandwidth is split between the receivers nearly perfectly, and with no decrease in net throughput.

Figure 15:
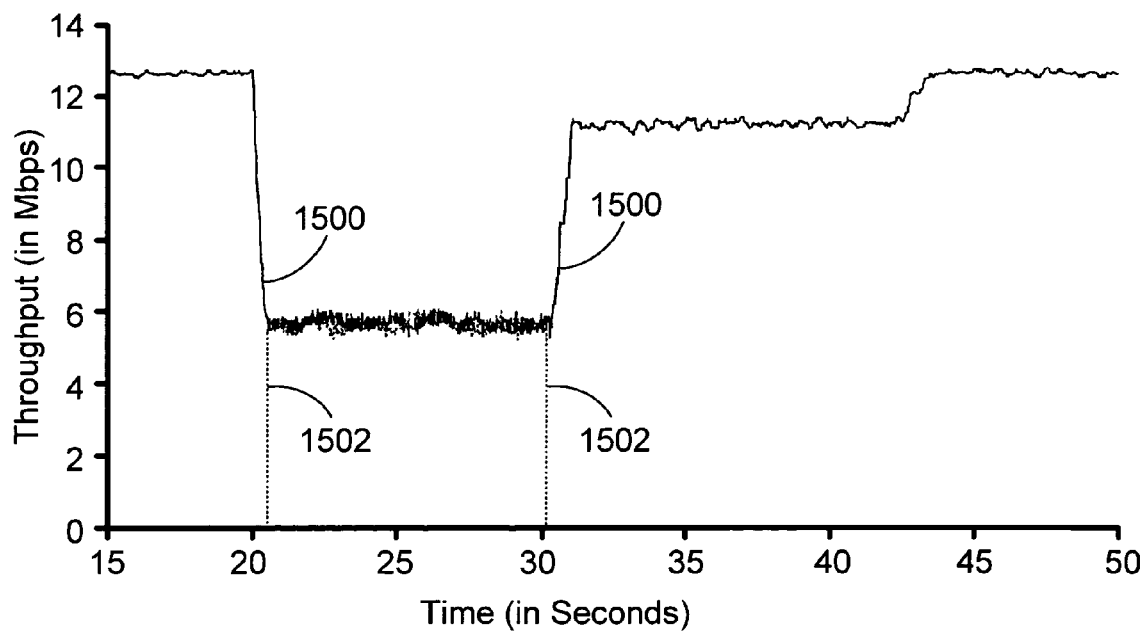
FIG. 15 is a graph illustrating the ability of the invention to detect a link breakage and resynchronize to other neighbors.

The effect of mobility at a micro-level on the performance of the invention was analyzed. Ideally, the invention should be able to detect a link breakage due to movement of a node and subsequently re-synchronize to other neighbors. It is shown that the invention can handle this scenario with an experiment comprising 3 nodes and 2 flows. In FIG. 15, the moving average over 280 ms of each flow's throughput is shown. Curve 1500 is the throughput of Node 2 and curve 1502 is the throughput of Node 3.

Figure 16:
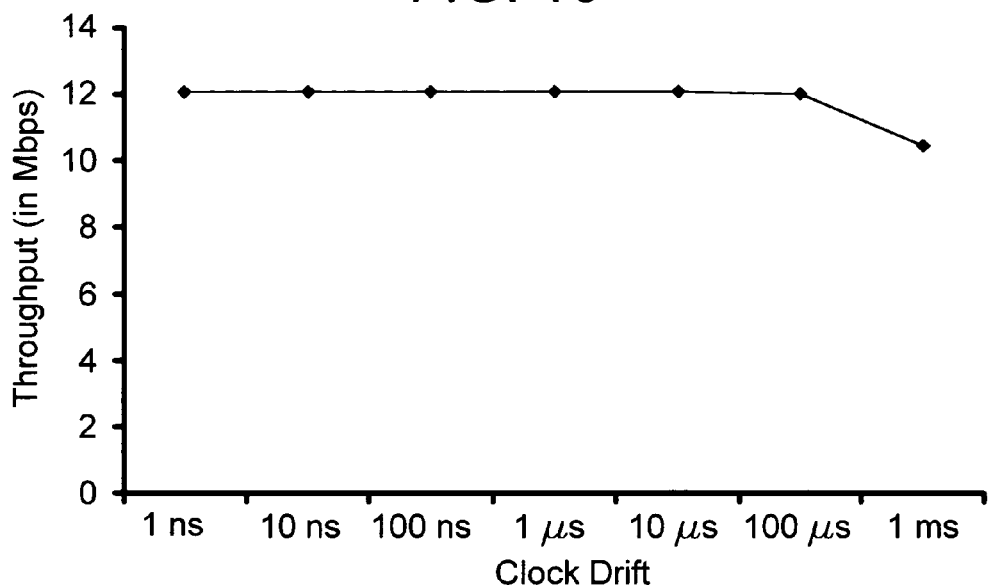
FIG. 16 is a graph illustrating the robustness of the invention to clock skew.

Node 1 is initially sending a maximum rate UDP flow to Node 2. Node 1 initiates a second UDP flow to Node 3 at around 20.5 seconds. This bandwidth is then shared between both the flows until 30 seconds, when Node 3 moves out of the communication range of Node 1. The experiment configures Node 1 to continue to attempt to send to Node 3 until 43 seconds, and during this time it continues to consume a small amount of bandwidth. When the flow to Node 3 finally stops, Node 2's received throughput increases back to its initial rate As previously described, the invention tries to synchronize slot begin and end times. One way to accomplish this is through the use of a simple averaging technique. This technique is known in the art and need not be described in detail herein. Regardless of the approach used, the invention is also designed to be robust to clock skew. The robustness of the invention to moderate clock skew is quantified in the following experiment. The throughput between two nodes is measured after artificially introducing a clock skew between them, and disabling the invention synchronization scheme for slot begin and end times. The clock skew is varied from 1 ns (10-6 ms) to 1 ms such that the sender is always ahead of the receiver by this value. The results are shown in FIG. 16.

Note that the throughput achieved between the two nodes is not significantly affected by a clock skew of less than 10 μs. These practical values of clock skew are extremely small to impact the performance of the invention. The drop in throughput is more for larger clock skews, although the throughput is still acceptable at 10.5 Mbps when the skew value is an extremely high 1 ms. These results indicate that the design choice of not requiring nodes to switch synchronously across slots is acceptable.

Figure 17:
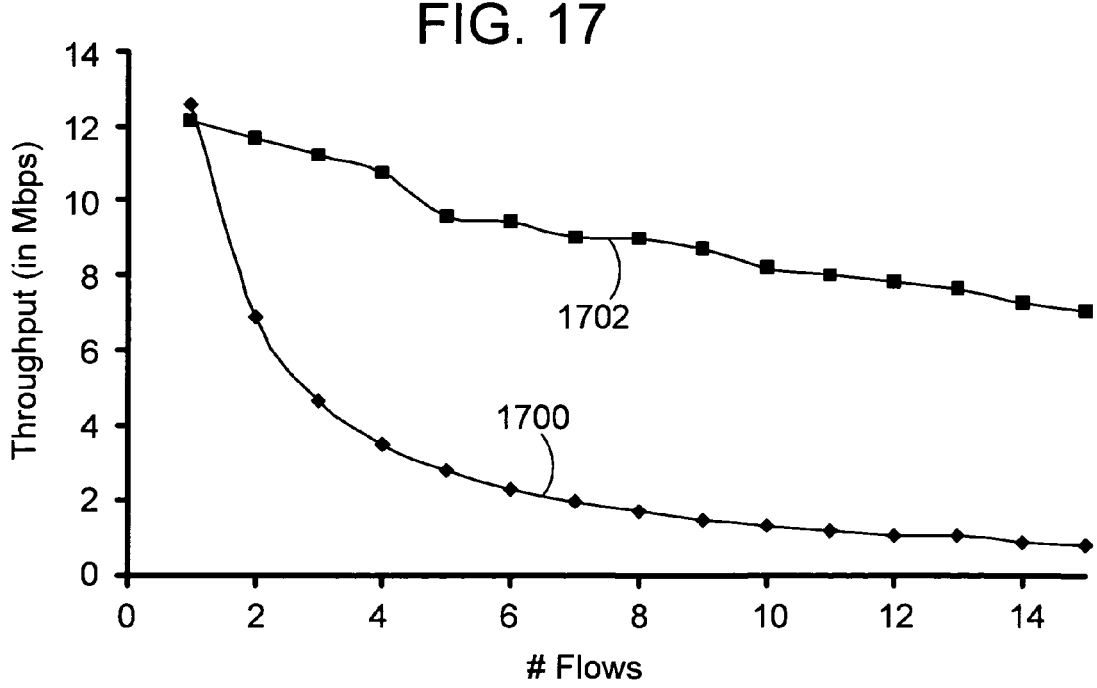
FIG. 17 is a graph illustrating the per-flow throughput of disjoint flows with respect to the number of flows of the invention and the 802.11a protocol.

Turning now to FIG. 17, simulations indicating the invention's ability to achieve and sustain a consistently high throughput for a traffic pattern consisting of multiple flows is shown. The number of disjoint flows that can be supported by the invention is examined. All nodes in this experiment are in communication range of each other, and therefore two flows are considered disjoint if they do not share either endpoint. Ideally, the invention should utilize the available bandwidth on all the channels on increasing the number of disjoint flows in the system. This is evaluated by varying the number of nodes in the network from 2 to 30 and introducing a flow between disjoint pairs of nodes where the number of flows varies from 1 to 15.

Figure 18:
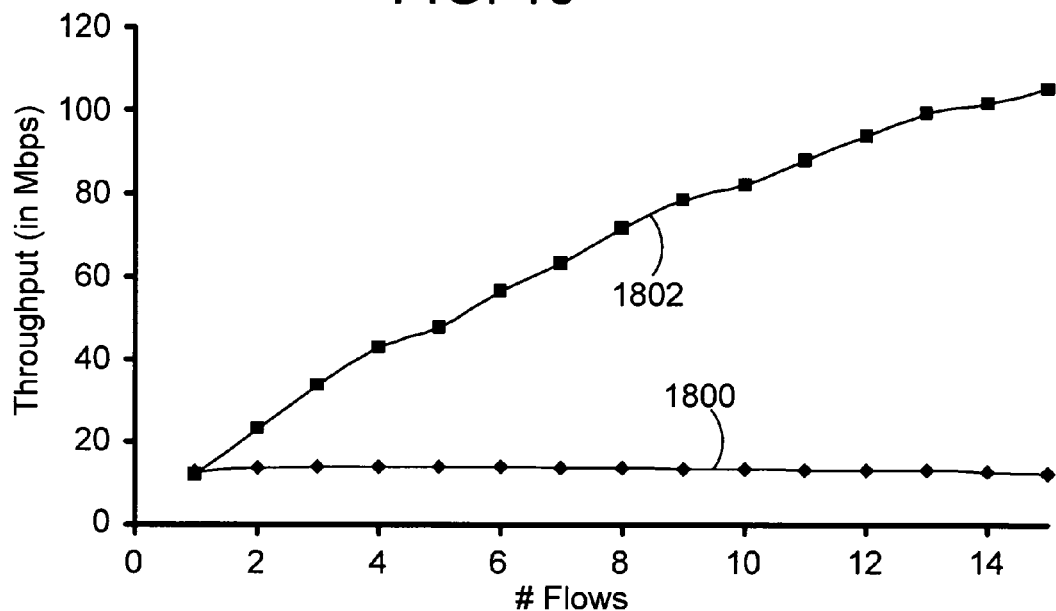
FIG. 18 is a graph illustrating the total system throughput of disjoint flows with respect to the number of flows of the invention and the 802.11a protocol.

FIG. 17 shows the per-flow throughput where curve 1700 is the 802.11a protocol and curve 1702 is the protocol of the invention. FIG. 18 shows the total system throughput where curve 1800 is the 802.11a protocol and curve 1802 is the protocol of the invention. IEEE 802.11a performs marginally better when there is just one flow in the network. When there is more than one flow, it can be seen that the invention significantly outperforms IEEE 802.11a.

An increase in the number of flows decreases the per-flow throughput for both the invention and IEEE 802.11a. However, the drop for IEEE 802.11a is much more significant. The drop for IEEE 802.11a is easily explained by FIG. 18, which shows that the overall system throughput for IEEE 802.11a is approximately constant.

It may seem surprising that the system throughput of the invention has not stabilized at 13 times the throughput of a single flow by the time there are 13 flows. This can be attributed to the invention's use of randomness to distribute flows across channels. These random choices do not lead to a perfectly balanced allocation, and therefore there is still unused spectrum even when there are 13 flows in the system, as shown by the continuing positive slope of the curve in FIG. 17.

Figure 19:
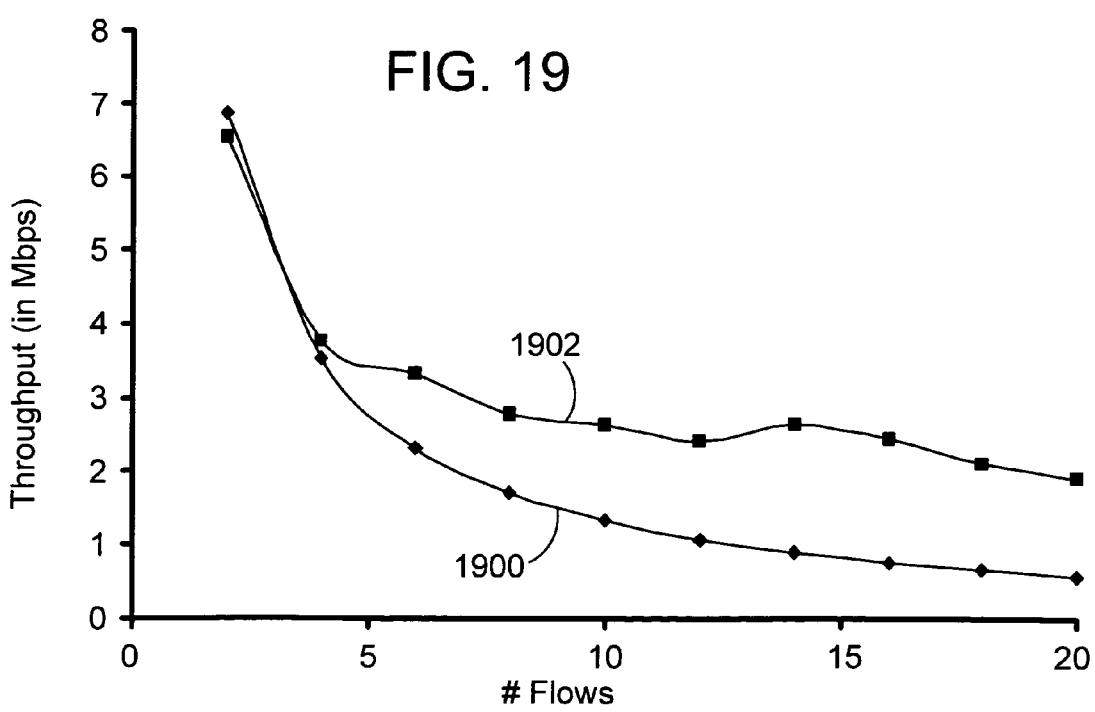
FIG. 19 is a graph illustrating the per-flow throughput of non-disjoint flows of the invention and the 802.11a protocol with respect to the number of flows.
Figure 20:
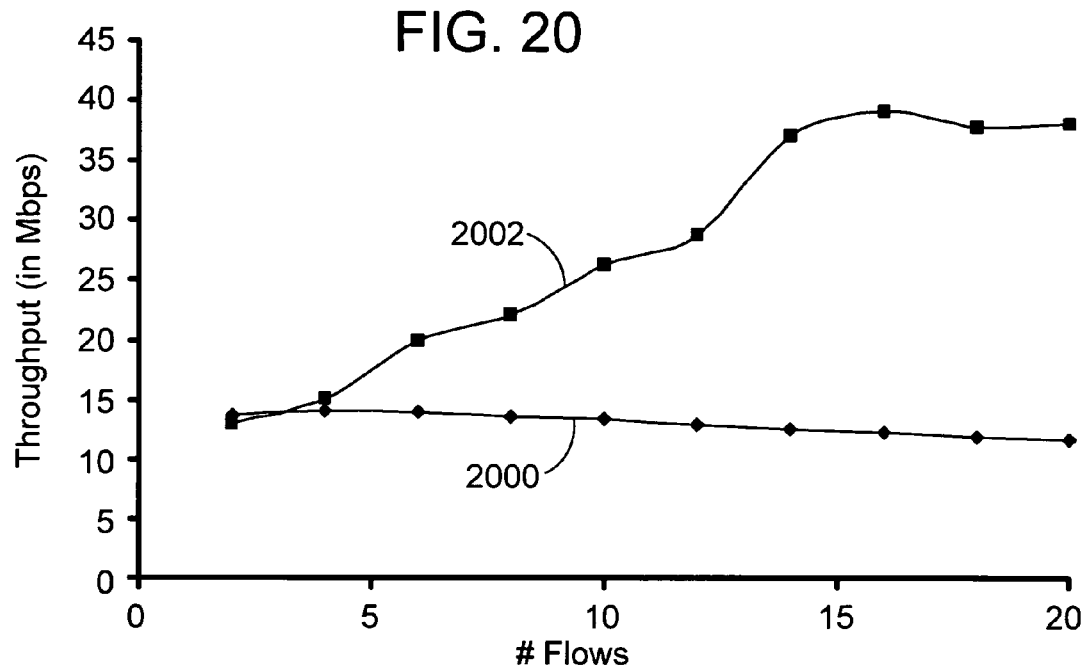
FIG. 20 is a graph illustrating the total system throughput of non-disjoint flows of the invention and the 802.11a protocol with respect to the number of flows.

Turning now to FIGS. 19 and 20, the case when the flows in the network are not disjoint (e.g., nodes participate as both sources and sinks and in multiple flows) is illustrated. These figures illustrate the invention's ability to efficiently support sharing among simultaneous flows that have a common endpoint. Each node in the network starts a maximum rate UDP flow with one other randomly chosen node in the network. The number of nodes (and thus flows) from 2 to 20 are varied. All nodes are within communication range of each other. The per-flow throughput is illustrated in FIG. 19 and system throughput is illustrated in FIG. 20 for the invention and IEEE 802.11a. Curves 1900 and 2000 are results of the 802.11a protocol and curves 1902 and 2002 are results of the protocol of the invention. The curves are not monotonic because variation in the random choices leads to some receivers being recipients in multiple flows (and hence bottlenecks). The invention performs slightly worse in the case of a single flow, but much better in the case of a large number of flows.

Figure 21:
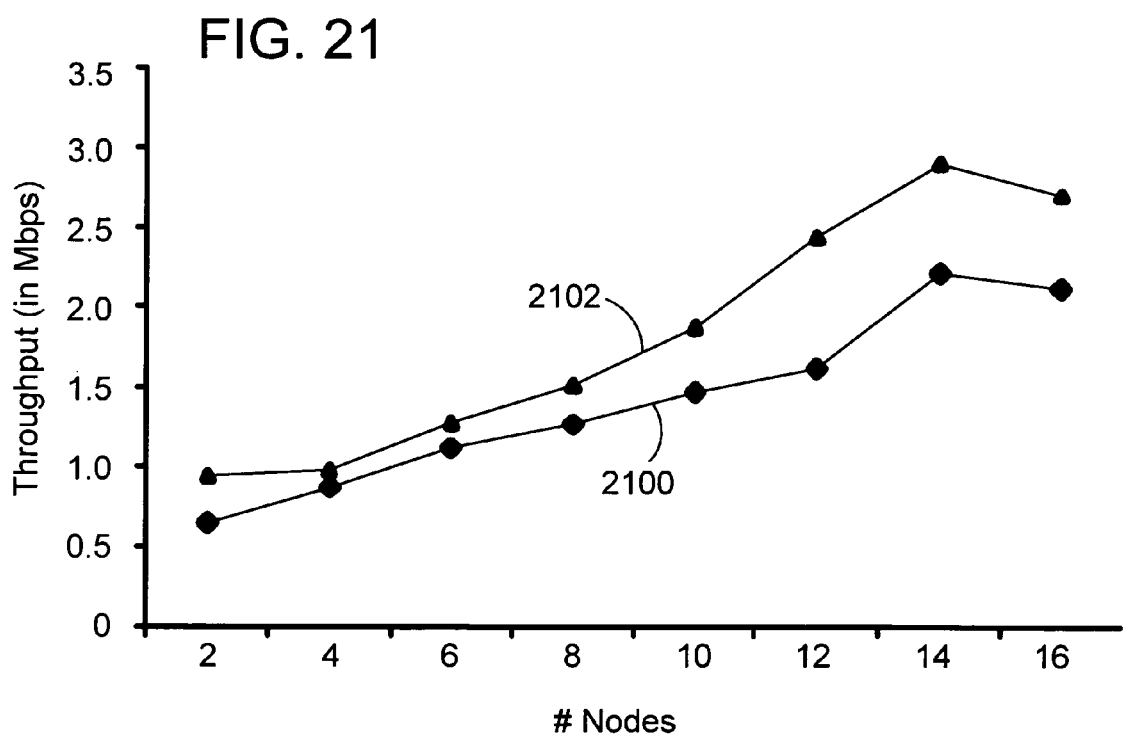
FIG. 21 is a graph illustrating the ratio of the invention throughput to the 802.11a protocol throughput for flows having different durations.

Turning now to FIG. 21, the effect of flow duration is shown. The invention introduces a delay when flows start because nodes must synchronize. This overhead is more significant for shorter flows. This overhead was evaluated for maximum rate UDP flows with different flow lengths. In the first experiment the flow duration is chosen randomly between 20 and 30 ms (curve 2100), while for the second experiment it is between 0.5 and 1 second (curve 2102). In both the experiments, each node starts a flow with a randomly selected node, discards all packets at the end of the designated sending window, pauses for a second at the end of the flow, and then starts another flow with a new randomly selected node. The decision to discard enqueued packets at the end of the flow duration is designed to model a time-sensitive application. This process continues for 30 seconds. These experiments were run for both the invention and IEEE 802.11a, and the number of nodes varied from 2 to 16.

FIG. 21 illustrates the ratio of the average throughput over the invention to the average throughput over IEEE 802.11a. Curve 2100 is for the IEEE 802.11a protocol and curve 2102 is for the protocol of the invention. For small numbers of sufficiently short-lived flows, IEEE 802.11a offers superior performance; short flows do indeed suffer from a more pronounced synchronization overhead. However, as soon as there are more than 4 simultaneous flows in the network, the ability of the invention to spread transmissions across multiple channels leads to a higher total throughput than IEEE 802.11a in both the short and long flow scenarios.

The behavior of TCP over the invention is now analyzed. The invention allows a node to stay synchronized to multiple nodes over different slots. This might cause significant jitter in packet delivery times, which could adversely affect TCP. To evaluate this concern quantitatively, an experiment was run where the number of nodes in the network was varied from 2 to 9, such that all nodes are in communication range of one another. An infinite-size file transfer over FTP is started from each node to a randomly selected other node.

Figure 22:
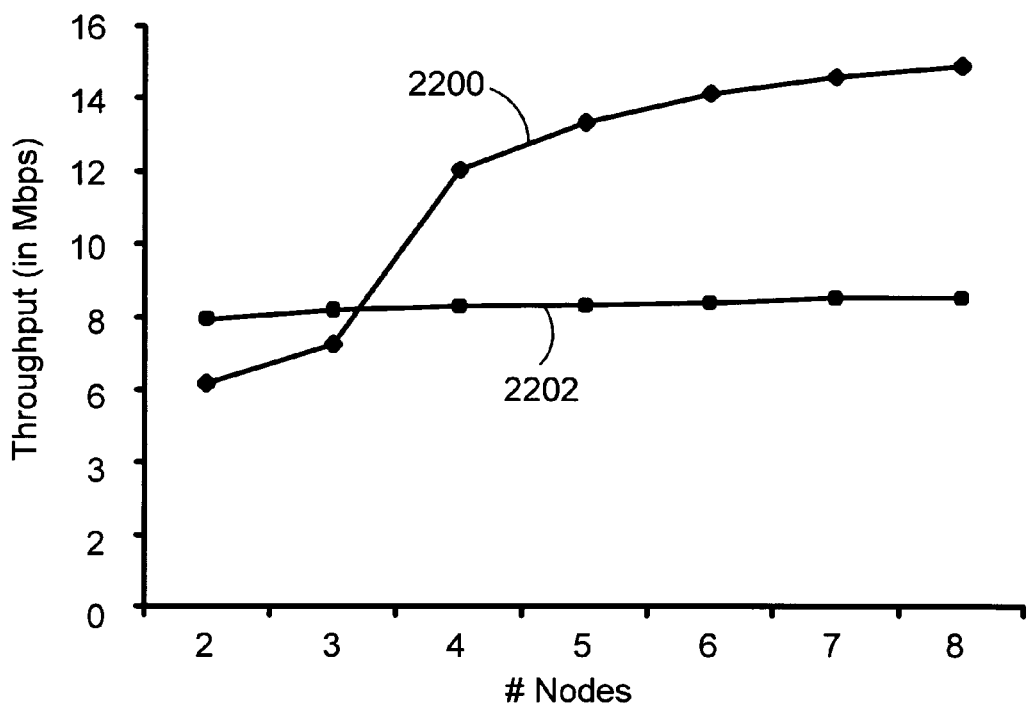
FIG. 22 is a graph illustrating the steady-state TCP throughput of the invention with a varying number of disjoint flows.

This choice to use non-disjoint flows is designed to stress the invention implementation by requiring nodes to be synchronized as either senders or receivers with multiple other nodes. In FIG. 22, the resulting cumulative steady-state TCP throughput over all the flows in the network is presented. Curve 2200 is result of the 802.11a protocol and curve 2202 is the result of the protocol of the invention.

FIG. 22 shows that the TCP throughput for a small number of flows is lower for the invention than the throughput over IEEE 802.11a. However, as the number of flows increases, the invention does achieve a higher system throughput. Although TCP over the invention does provide higher aggregate throughput than over IEEE 802.11a, the performance improvement is not nearly as good as for UDP flows. This shows that jitter due to the invention does have an impact on the performance of TCP.

Figure 23:
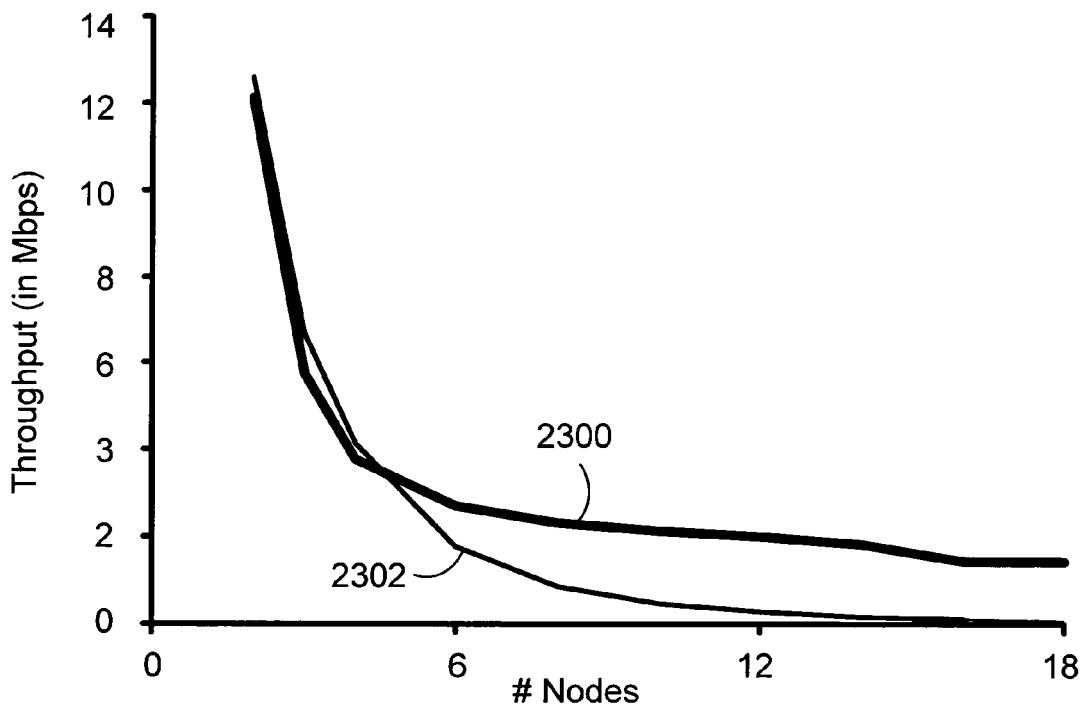
FIG. 23 is a graph illustrating the variation in throughput of the invention and the 802.11a protocol in a multi-hop chain network as a function of the number of nodes in the chain.

The performance of the invention when combined with multi-hop flows and mobile nodes will now be analyzed. IEEE 802.11 is known to encounter significant performance problems in a multi-hop network. For example, if all nodes are on the same channel, the RTS/CTS mechanism allows at most one hop in an A-B-C-D chain to be active at any given time. The invention reduces the throughput drop due to this behavior by allowing nodes to communicate on different channels. To examine this, both the invention and IEEE 802.11a in a multi-hop chain network are evaluated. The number of nodes is varied from 2 to 18 and the nodes are all in communication range. A single flow that encounters every node in the network in initiated. Note that while more than 4 nodes transmitting within interference range of each other would be unlikely to arise from multi-hop routing of a single flow, it could easily arise in a general distributed application. FIG. 23 shows the maximum throughput as the number of nodes in the chain is varied. Curve 2300 is the result for the 802.11a protocol and curve 2302 is the result for the protocol of the invention. It can be seen that there is not much difference between the invention and IEEE 802.11a for flows with few hops. As the number of hops increases, the invention performs much better than IEEE 802.11a since it distributes the communication on each hop across all the available channels.

The performance of the invention in a large scale multi-hop network without mobility will now be analyzed. One hundred nodes are placed uniformly in a 200×200 meter area, and each node is set to transmit with a power of 21 dBm. The Dynamic Source Routing (DSR) protocol is used to discover the source route between different source-destination pairs. These source routes are then input to a static variant of DSR that does not perform discovery or maintain routes. The number of maximum rate UDP flows is varied from 10 to 50. Source-destination pairs are generated by choosing randomly and rejecting pairs that are within a single hop of each other. The per-flow throughput is illustrated in FIG. 24. Curve 2400 is for the 802.11a protocol and curve 2402 is for the protocol of the invention. Increasing the number of flows leads to greater contention, and the average throughput of both the invention and IEEE 802.11a drops. For every considered number of flows, the invention provides significantly higher throughput than IEEE 802.11a. For 50 flows, the inefficiencies of sharing a single channel are sufficiently pronounced that the invention yields more than a factor of 15 capacity improvement.

Previous work on multi-channel MACs has often overlooked the effect of channel switching on routing protocols. Most of the proposed protocols for MANETs (Mobile Ad-hoc NETworks) rely heavily on broadcasts (e.g., DSR and AODV [Ad-hoc On Demand Distance Vector]). However, neighbors using a multi-channel MAC could be on different channels, which could cause broadcasts to reach significantly fewer neighbors than in a single-channel MAC. The invention addresses this concern using a broadcast retransmission strategy as previously discussed.

The behavior of DSR over the invention was analyzed in a setup with 100 nodes uniformly placed in a 200 m×200 m area. The transmission is reduced with the power of each node to 16 dBm to force routes to increase in length (and hence to stress DSR over the invention). Ten source-destination pairs are selected at random and DSR is used to discover routes between them. In FIG. 25, the performance of DSR over the invention is compared when varying the invention broadcast transmission count parameter (the number of consecutive slots in which each broadcast packet is sent once).

FIG. 25 shows that the performance of DSR over the invention improves with an increase in the broadcast transmission count. Curve 2500 is the route discovery time and curve 2502 is the average route length. The DSR Route Request packets see more neighbors when the invention broadcasts them over a greater number of slots. This increases the likelihood of discovering shorter routes, and the speed with which routes are discovered. However, there seems to be little additional benefit to increasing the broadcast parameter to a value greater than six. The slight bumpiness in the curves is attributed to the stochastic nature of DSR, and its reliance on broadcasts.

In comparing the invention to IEEE 802.11a, it can be seen that the invention discovers routes that are comparable in length. However, the average route discovery time for the invention is much higher than for IEEE 802.11 a. Because each slot is 10 ms in length, broadcasts are only retransmitted once every 10 ms, and this leads to a significantly longer time to discover a route to a given destination node. It is believed that this latency is a fundamental difficulty in using a reactive protocol such as DSR with the invention.

The impact of mobility in a network using DSR over IEEE 802.11a and the invention will now be analyzed. One hundred nodes are placed randomly in a square and select 10 flows. Each node transmits packets at 21 dBm. Node movement is determined using the Random Waypoint model. In this model, each node has a predefined minimum and maximum speed. Nodes select a random point in the simulation area and move towards it with a speed chosen randomly from the interval. After reaching its destination, a node rests for a period chosen from a uniform distribution between 0 and 10 seconds. It then chooses a new destination and repeats the procedure. The minimum speed was fixed at 0.01 m/s and the maximum speed varied from 0.2 to 1.0 m/s. The results are not significantly different at higher speeds. Two different areas were used for the nodes; a 200 m×200 m area and a 300 m×300 m area. The smaller area is referred to as the dense network, and the larger area as the sparse network. The average path is 0.5 hops longer in the sparse network. The invention broadcast transmission count parameter was set to six.

Figure 26:
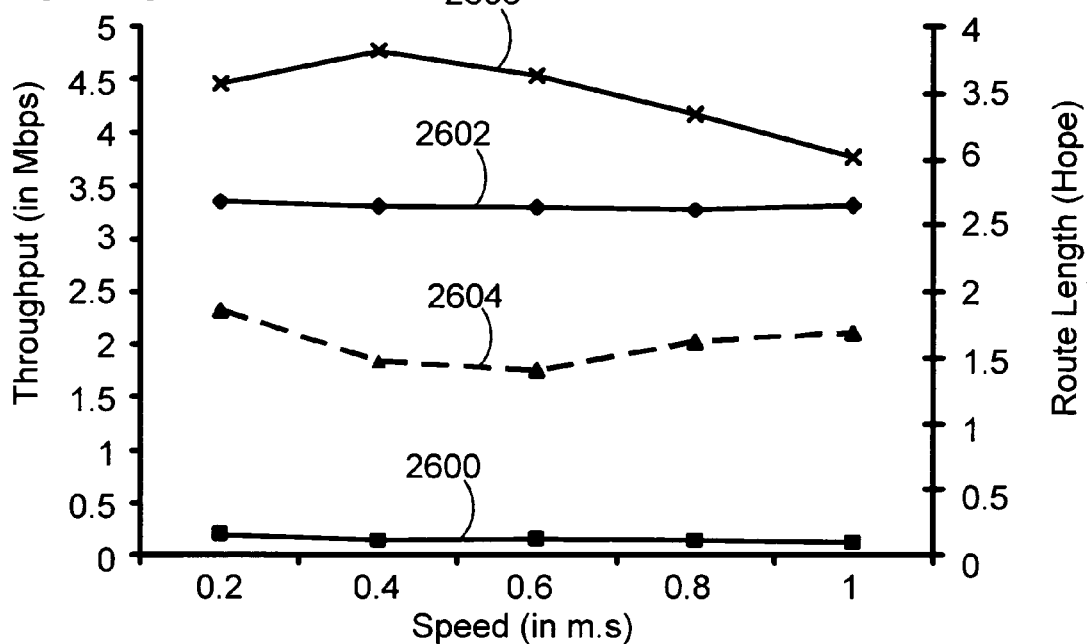
FIG. 26 is a graph illustrating the per-flow throughput and the average route length for 10 flows in a 100 node dense multi-hop mobile network using DSR with the invention and with the 802.11a protocol.
Figure 27:
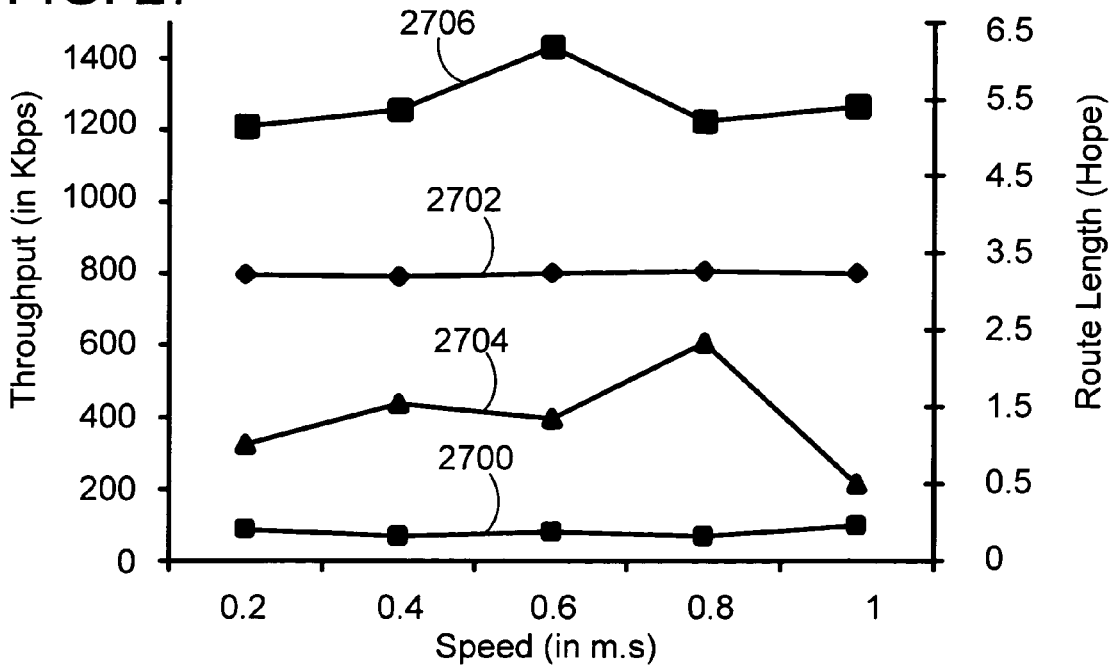
FIG. 27 is a graph illustrating the per-flow throughput and the average route length for 10 flows in a 100 node sparse multi-hop mobile network using DSR with the invention and with the 802.11a protocol.

It can be seen in FIG. 26 that in a dense network, the invention yields much greater throughput than IEEE 802.11a even when there is mobility. Curve 2600 is throughput using 802.11a, curve 2602 is the number of hops using 802.11a, curve 2604 is throughput using the invention, and curve 2606 is the number of hops using the invention. Although DSR discovers shorter routes over IEEE 802.11a, the ability of the invention to distribute traffic on a greater number of channels leads to much higher overall throughput. FIG. 27 evaluates the same benchmarks in a sparse network. Curve 2700 is throughput using 802.11a, curve 2702 is the number of hops using 802.11a, curve 2704 is throughput using the invention, and curve 2706 is the number of hops using the invention. The results show that the per-flow throughput decreases in a sparse network for both the invention and IEEE 802.11a. The reason for this is that the route lengths are greater and it takes more time to repair routes. However, the same qualitative comparison continues to hold: the invention causes DSR to discover longer routes, but still leads to an overall capacity improvement.

DSR discovers longer routes over the invention than over IEEE 802.11a because broadcast packets sent over the invention may not reach a node's entire neighbor set. Furthermore, some optimizations of DSR, such as promiscuous mode operation of nodes, are not as effective in a multi-channel MAC such as the invention. Thus, although the throughput of mobile nodes using DSR over the invention is much better than their throughput over IEEE 802.11a, a routing protocol that takes the channel switching behavior of the invention into account will likely lead to even better performance.

From the foregoing, it can be seen that a new protocol that extends the benefits of channelization to ad-hoc networks has been presented. This protocol is compatible with the IEEE 802.11 standard and is suitable for a multi-hop environment. The invention achieves these gains using an approach called optimistic synchronization. The technique allows control traffic to be distributed across all channels, thereby avoiding control channel saturation. This approach should to be useful in additional settings beyond channel hopping. The invention yields significant capacity improvement in a variety of single-hop and multi-hop wireless scenarios.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to transmit and receive packets in a node switching between a plurality of slots in a wireless network having a plurality of channels without requiring multiple radios, the method comprising the steps of:
   determining a channel hopping schedule such that the channel hopping schedule overlaps with at least one other node for which the node has a packet to send, the channel hopping schedule having a schedule for each slot;
   broadcasting the channel hopping schedule;
   switching the node to a channel specified for a current slot of the plurality of slots;
   switching the node from the channel in the current slot to a channel specified for a next slot in the channel hopping schedule;
   repeating the step of switching the node from the channel in the current slot to a channel specified for a next slot in the channel hopping schedule until the channel hopping schedule for each slot has been completed;
   incrementing each of the channels in the channel hopping schedule; and
   if the node is switched to a channel in which the at least one other node is presently active, sending the packet to the at least one other node.

2. The method of claim 1 wherein the step of incrementing each of the channels in the channel hopping schedule comprises the step of incrementing each of the channels in the channel hopping schedule using addition modulo of a prime integer.

3. The method of claim 1 further comprising the step of delaying the step of switching the node from the channel in the current slot to a channel specified for a next slot in the channel hopping schedule if the node is one of transmitting and receiving a packet.

4. The method of claim 1 wherein the channel hopping schedule for each slot comprises a (channel, seed) pair.

5. The method of claim 4 wherein the step of incrementing each of the channels in the channel hopping schedule comprises the step of incrementing each of the channels in each slot using the seed according to the equation $$x_{new} \leftarrow (x_{old} + seed) \bmod \text{primenumber}$$

where $x_{old}$ is the current channel of the slot, $x_{new}$ is the new channel of the slot, and primenumber is a predetermined prime number.

6. The method of claim 5 wherein the predetermined prime number is the number of channels in the plurality of channels if the number of channels is a prime number.

7. The method of claim 5 wherein the predetermined prime number is a prime number higher than the number of channels in the plurality of channels if the number of channels is not a prime number.

8. The method of claim 7 further comprising the step of mapping down using a modulus to the actual number of channels in the plurality of channels.

9. The method of claim 1 further comprising the step of switching to a parity slot.

10. The method of claim 1 further comprising the step of changing a portion of the channel hopping schedule if the node does not have an overlap with a recipient node for which the node has packets to send.

11. The method of claim 10 wherein the step of changing a portion of the channel hopping schedule if the node does not have an overlap with the recipient node comprises the steps of:
    determining if there is a non-receiving slot; and
    if there is at least one non-receiving slot, changing a (channel, seed) pair of the at least one non-receiving slot to overlap with the nodes for which the node has packets to send such that there is overlap.

12. The method of claim 11 wherein the step of determining if there is a non-receiving slot comprises the steps of:
    maintaining a count of packets received for each slot duration for the number of packets received during the previous time a channel was active;
    if any slot has not received more than a predetermined number of packets, identifying that slot as a non-receiving slot.

13. The method of claim 1 further comprising the step of de-synchronizing a slot if a number of other nodes synchronized to the same (channel, seed) pair of the slot is more than twice as many nodes as the node communicated with in the previous occurrence of the slot.

14. The method of claim 13 wherein the step of desynchronizing comprises the step of selecting a new (channel, seed) pair for the slot.

15. The method of claim 1 wherein the step of broadcasting the channel hopping schedule comprises the step of broadcasting the channel hopping schedule in an IEEE 802.11 long control frame header format.

16. The method of claim 15 wherein the step of broadcasting the channel hopping schedule in an IEEE 802.11 long control frame header format comprises the step of using unused bytes to embed (channel, seed) pairs and an offset.

17. The method of claim 1 further comprising the step of attempting to transmit packets to the at least one other node at the beginning of a slot in a round-robin manner among all flows.

18. The method of claim 17 further comprising the step of reducing priority of a flow to a particular node if packet transmission to the particular node fails.

19. The method of claim 18 wherein the step of reducing priority of the flow to the particular node comprises the step of reducing priority of the flow until a period of time equal to one half of a slot duration has passed.

20. The method of claim 18 further comprising the step of dropping an entire flow of packets to the at least one other node if attempts to transmit a packet to the at least one other node have failed for an entire cycle through the channel hopping schedule.

21. A tangible computer-readable medium having stored thereon computer-executable instructions for performing a method to transmit and receive packets in a node switching between a plurality of slots in a wireless network having a plurality of channels without requiring multiple radios, the method comprising the steps of:

determining a channel hopping schedule such that the channel hopping schedule overlaps with at least one other node for which the node has a packet to send, the channel hopping schedule having a schedule for each slot;

broadcasting the channel hopping schedule;

switching the node to a channel specified for a current slot of the plurality of slots;

switching the node from the channel in the current slot to a channel specified for a next slot in the channel hopping schedule;

repeating the step of switching the node from the channel in the current slot to a channel specified for a next slot in the channel hopping schedule until the channel hopping schedule for each slot has been completed;

incrementing each of the channels in the channel hopping schedule; and if the node is switched to a channel in which the at least one other node is presently active, sending the packet to the at least one other node.

22. The tangible computer-readable medium of claim 21 having further computer executable instructions for performing the steps comprising delaying the step of switching the node from the channel in the previous slot to a channel specified for a next slot in the channel hopping schedule if the node is one of transmitting and receiving a packet.

23. The tangible computer-readable medium of claim 21 wherein the channel hopping schedule for each slot comprises a (channel, seed) pair.

24. The tangible computer-readable medium of claim 23 wherein the step of incrementing each of the channels in the channel hopping schedule comprises the step of incrementing each of the channels in each slot using the seed according to the equation $$x_{new} \leftarrow (x_{old} + seed) \bmod primenumber$$

where $x_{old}$ is the current channel of the slot, $x_{new}$ is the new channel of the slot, and primenumber is a predetermined prime number.

25. The tangible computer-readable medium of claim 24 wherein the predetermined prime number is the number of channels in the plurality of channels if the number of channels is a prime number.

26. The tangible computer-readable medium of claim 24 wherein the predetermined prime number is a prime number higher than the number of channels in the plurality of channels if the number of channels is not a prime number, the at least one computer-readable medium having further computer executable instructions for performing the step comprising mapping down using a modulus to the actual number of channels in the plurality of channels.

27. The tangible computer-readable medium of claim 21 further comprising the step of switching to a parity slot.

28. The tangible computer-readable medium of claim 21 further comprising the step of changing a portion of the channel hopping schedule if the node does not have an overlap with a recipient node for which the node has packets to send.

29. The tangible computer-readable medium of claim 28 wherein the step of changing a portion of the channel hopping schedule if the node does not have an overlap with the recipient node comprises the steps of:

determining if there is a non-receiving slot; and if there is at least one non-receiving slot, changing a (channel, seed) pair of the at least one non-receiving slot to overlap with the nodes for which the node has packets to send such that there is overlap.

30. The tangible computer-readable medium of claim 29 wherein the step of determining if there is a non-receiving slot comprises the steps of:

maintaining a count of packets received for each slot duration for the number of packets received during the previous time a channel was active;

if any slot has not received more than a predetermined number of packets, identifying that slot as a non-receiving slot.

31. The tangible computer-readable medium of claim 21 further comprising the step of de-synchronizing a slot if a number of other nodes synchronized to the same (channel, seed) pair of the slot is more than twice as many nodes as the node communicated with in the previous occurrence of the slot.

32. The tangible computer-readable medium of claim 31 wherein the step of desynchronizing comprises the step of selecting a new (channel, seed) pair for the slot.

33. The tangible computer-readable medium of claim 21 wherein the step of broadcasting the channel hopping schedule comprises the step of broadcasting the channel hopping schedule in an IEEE 802.11 long control frame header format.

34. The tangible computer-readable medium of claim 26 having further computer executable instructions for performing the step comprising attempting to transmit packets to the at least one other node at the beginning of a slot in a round robin manner among all flows.

35. The tangible computer-readable medium of claim 34 having further computer executable instructions for performing the step comprising reducing priority of a flow to a particular node if packet transmission to the particular node fails.

36. The tangible computer-readable medium of claim 35 wherein the step of reducing priority of the flow to the particular node comprises the step of reducing priority of the flow until a period of time equal to one half of a slot duration has passed.

37. The tangible computer-readable medium of claim 35 having further computer executable instructions for performing the step comprising dropping an entire flow of packets to the at least one other node if attempts to transmit a packet to the at least one other node have failed for an entire cycle through the channel hopping schedule.

* * * * *